United States Patent
Kokubun et al.

(10) Patent No.: US 8,761,562 B2
(45) Date of Patent: Jun. 24, 2014

(54) MULTICORE FIBER AND CORE PLACEMENT METHOD FOR MULTICORE FIBER

(75) Inventors: Yasuo Kokubun, Kanagawa (JP); Kohei Tomozawa, Aichi (JP)

(73) Assignee: National University Corporation Yokohama National University, Yokohama-shi (JP)

( * ) Notice: Subject to any disclaimer, the term of this patent is extended or adjusted under 35 U.S.C. 154(b) by 0 days.

(21) Appl. No.: 13/818,588

(22) PCT Filed: Aug. 23, 2011

(86) PCT No.: PCT/JP2011/068988
§ 371 (c)(1),
(2), (4) Date: Feb. 22, 2013

(87) PCT Pub. No.: WO2012/026473
PCT Pub. Date: Mar. 1, 2012

(65) Prior Publication Data
US 2013/0156393 A1    Jun. 20, 2013

(30) Foreign Application Priority Data

Aug. 24, 2010  (JP) ................ 2010-187375

(51) Int. Cl.
*G02B 6/036* (2006.01)
*G02B 6/02* (2006.01)
*G02B 6/122* (2006.01)

(52) U.S. Cl.
CPC ........ *G02B 6/02338* (2013.01); *G02B 6/02042* (2013.01); *G02B 6/02328* (2013.01); *G02B 6/02347* (2013.01); *G02B 6/02357* (2013.01); *G02B 6/1225* (2013.01); *G02B 6/02352* (2013.01)
USPC ....................................... 385/126

(58) Field of Classification Search
CPC .......... G02B 6/02042; G02B 6/02328; G02B 6/02347; G02B 6/02338; G02B 6/02357; G02B 6/1225; G02B 6/02352
USPC .................................. 385/122–128
See application file for complete search history.

(56) References Cited

U.S. PATENT DOCUMENTS 5,519,801 A    5/1996 Le Noane et al.

OTHER PUBLICATIONS

Translation of the International Preliminary Report on Patentability (PCT/ISA/237) (3 pages), (PCT/IB/373) (1 page) of International Application No. PCT/JP2011/068988 issued Feb. 26, 2013, (Form PCT/IB/326) (1 pages).

(Continued)

*Primary Examiner* — Ryan Lepisto
*Assistant Examiner* — Erin Chiem
(74) *Attorney, Agent, or Firm* — Westerman, Hattori, Daniels & Adrian, LLP

(57) ABSTRACT

In a multicore fiber in which multiple single mode cores are stored in one optical fiber, the multicore fiber has a lattice-point arrangement in which multiple lattice points are periodically arranged two-dimensionally with translational symmetry and rotational symmetry or one of translational symmetry and rotational symmetry and, in that lattice-point arrangement, multiple cores are arranged with the lattice points of the lattice-point arrangement as reference positions. By giving different perturbations to the propagation constants of the cores, the propagation constants of the cores are each varied from the original propagation constants. Because of the variation in the propagation constants, the core-to-core coupling amount, which is dependent on the varied propagation constants, fall below a predetermined setting amount. Suppressing the coupling between homogeneous cores in this way reduces the distance between the homogeneous cores, thus increasing the core density of the multicore fiber without increasing the types of heterogeneous cores.

14 Claims, 28 Drawing Sheets

(56) References Cited

OTHER PUBLICATIONS

Translation of the International Preliminary Report on Patentability (PCT/ISA/237) (6 pages), (PCT/IB/373) (1 page) of International Application No. PCT/JP2011/068988 mailed Mar. 28, 2013, (Form PCT/IB/338) (1 page).

Yasuo Kokubun et al., "Proposal of Heterogeneous Uncoupled and Homogeneous Coupled Multicore Fibers for Space/Mode-Division Multiplexing", IEICE Technical Report, OPE2009-30-OPE2009-73 Hikari Electronics, Jul. 23, 2009, vol. 109, No. 159, pp. 165-170.

Yasuo Kokubun et al., "High density packing of heterogeneous uncoupled multicore fibers by strained lattice", 2010 Nen IEICE Communications Society Taikai Koen Ronbunshu 2, Aug. 31, 2010, pp. S-33, S-34 (with concise explanation).

Yasuo Kokubun et al., "High density packing of low heterogeneous uncoupled multi-core fiber by strained lattice", Proceedings of the 2011 IEICE General Conference, Tsushin Koen Ronbunshu 2, Feb. 28, 2011, p. 310 (with concise explanation).

S. Inao et al., "High density multicore-fiber cable", Proceedings of the 28th International Wire & Cable Symposium (IWCS), 1979, pp. 370-384.

B. Rosinski et al., "Multichannel transmission of a multicore fiber coupled with Vertical-Cavity Surface-Emitting Lasers", Journal of Lightwave Technology, vol. 17, No. 5, May 1999, pp. 807-810.

M. Koshiba et al., "Heterogeneous multi-core fibers: proposal and design principle,"IEICE Electronics Express, vol. 6, No. 2, Jan. 2009, pp. 98-102.

K.Tomozawa et al., "Maximum number of cores in heterogenuous uncoupled multicore fibers", Proceedings of the IEICE General Conference in 2010, The Institute of Electronics, Information and Communication Engineers, Mar. 2010, 4 pages.

K. Tomozawa et al., "Maximum core capacity of heterogeneous uncoupled multi-core fibers", 15th OptoElectronics and Communications Conference (OECC2010), Sapporo, Jul. 2010, pp. 170-171.

International Search Report for PCT/JP2011/068988, mailing date of Sep. 20, 2011.

Written Opinion of the International Searching Authority for PCT/JP2011/068988, mailing date of Sep. 20, 2011.

Even mode $\beta_e$    Odd mode $\beta_o$

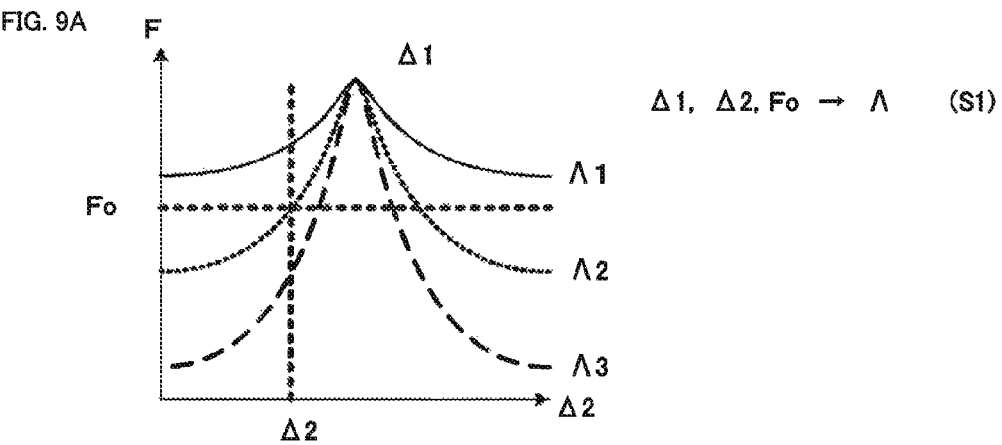
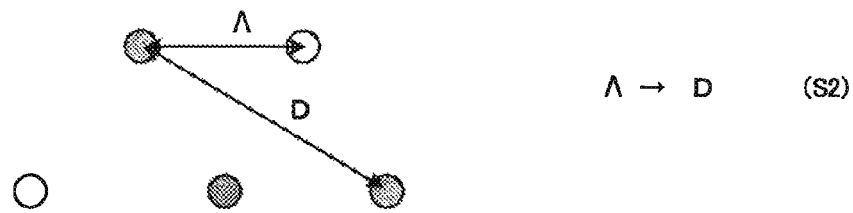
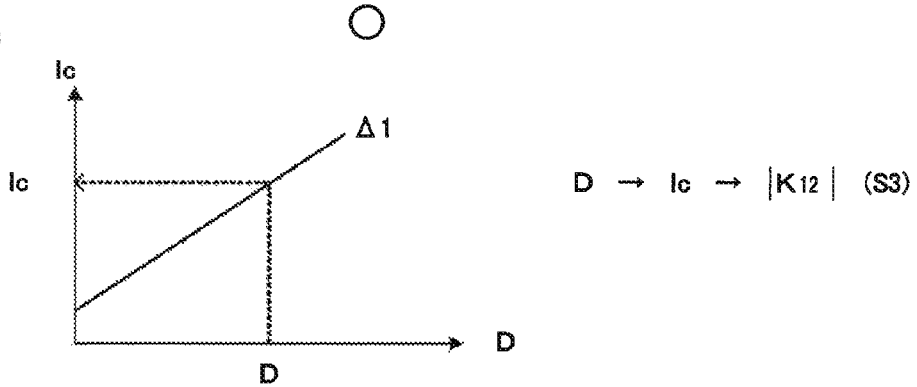
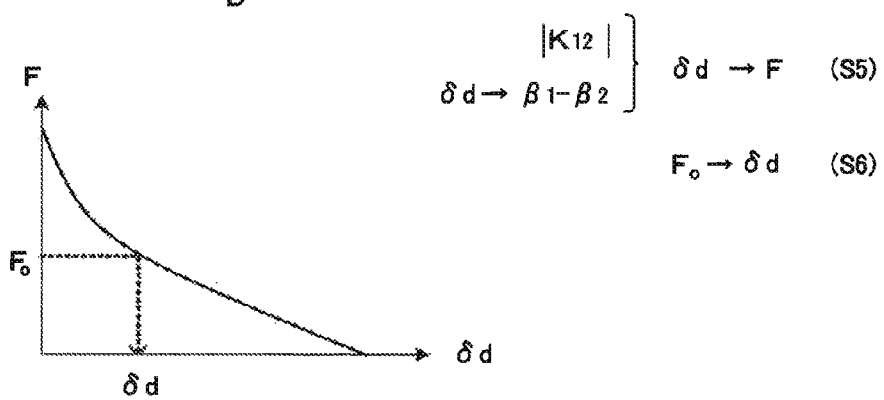

37 CORES
D=26 μm
Λ=26/√3=15 μm

19 CORES
D=40 μm
Λ=40/√3=23 μm

CONVENTIONAL CONFIGURATION
7 CORES $$\Lambda = \frac{70\ \mu m}{\sqrt{3}} = 40\ \mu m$$

$$D = 70\ \mu m$$

PRESENT INVENTION
7 CORES $\delta\ dx = 1.72\ \mu m$ $\delta\ dy = 4.95\ \mu m$ $\Lambda = 22\ \mu m$ $D = 38\ \mu m$

PRESENT INVENTION
14 CORES $\Lambda = 22\ \mu m$ $D = 38\ \mu m$ $\delta\ dx = 1.72\ \mu m$ $\delta\ dy = 4.95\ \mu m$

| TRIANGULAR ARRANGEMENT | | | PRESENT INVENTION | CONVENTIONAL CONFIGURATION |
|---|---|---|---|---|
| HIGH REFRACTIVE-INDEX-DIFFERENCE | NUMBER OF CORES | | 37 | 19 |
| | D | | 22.5 μm | 40 μm |
| | Λ | | 13 μm | 23 μm |
| LOW REFRACTIVE-INDEX-DIFFERENCE | NUMBER OF CORES | | 14 | 7 |
| | D | | 38.1 μm | 70 μm |
| | Λ | | 22 μm | 40 μm |

FIG. 21

P AIR HOLE

INDEPENDENT WAVEGUIDE (UNCOUPLED) CORE

UNCOUPLED WAVEGUIDE

19 CORES $$\Lambda = \frac{40 \mu m}{\sqrt{3}} = 23 \mu m$$

MULTICORE FIBER AND CORE PLACEMENT METHOD FOR MULTICORE FIBER

TECHNICAL FIELD

The present invention relates to a multicore fiber for use in dense space-division multiplexed transmission and a core arrangement method for a multicore fiber.

BACKGROUND ART

As terms for representing an inter-core coupling state in a general sense, the term "coupled state" and the term "incomplete coupled state" are used. As terms for representing an inter-core coupling state in a more strict sense, the term "complete coupled state" and the term "non-coupled state" are used.

The term "coupled state" represents the coupling state in which the coupling ratio is almost 1, and the term "incomplete coupled state" represents the coupling state in which the coupling ratio is smaller than 1 but not completely 0.

The term "complete coupled state" represents the coupling state in which the coupling ratio is completely 1, and the term "non-coupled state" represents the coupling state in which the coupling ratio is so close to 0 that the coupling ratio cannot be measured.

In the field of a multicore fiber, the term "coupled multicore fiber" and the term "uncoupled multicore fiber" are used. In this case, the coupling in a "coupled multicore fiber" means that the inter-core coupling state is the "coupled state" in a general sense, and the coupling in an "uncoupled multicore fiber" means that the inter-core coupling state is the "incomplete coupled state" in a general sense.

In the present invention, the terms used in the field of a multicore fiber are used. That is, "uncoupled" in an "uncoupled multicore fiber" is not "non-coupled" in a strict sense but "incomplete coupled" in a general sense, which means a coupling state in which the coupling ratio is smaller than 1 but not completely 0.

For use in spatial multiplexed transmission using a multicore fiber, the configurations in which multiple single mode cores are accommodated in one optical fiber, such as those disclosed in Non-Patent Literature 1 and Non-Patent Literature 2, are known.

To keep individual cores in the uncoupled state, the following configurations are known: a configuration in which the cores are placed with an enough core-to-core distance, a configuration in which cores with different propagation constants are used so that the incompletely coupled state is maintained even if the cores are placed close enough, and a configuration in which a dividing layer or an air hole is provided between cores.

FIG. 24 is a diagram showing the simplest model for describing the inter-core coupling state of a multicore fiber.

An attempt to configure an uncoupled multicore fiber using homogeneous cores with the same propagation constant requires that the core-to-core interval be extended largely to avoid crosstalk between the cores, making it difficult to increase the core density. To solve this problem, an uncoupled multicore fiber uses heterogeneous cores with different propagation constants to provide a multicore fiber.

FIG. 24A shows independent waveguides of heterogeneous cores with different propagation constants $\beta_0^{(1)}$ and $\beta_0^{(2)}$. FIG. 24B shows an uncoupled waveguide of two types of heterogeneous cores with different propagation constants. A multicore fiber using two types of heterogeneous cores, which have different propagation constants $\beta^{(1)}$ and $\beta^{(2)}$, forms an uncoupled waveguide.

Heterogeneous cores represent cores with different propagation constants, and homogeneous cores represent cores with the same propagation constant.

Propagation constants may be made different by using different values for the parameters such as a refractive index difference, a core diameter, and a refractive index distribution. FIG. 25 shows an example of different propagation constants. FIG. 25A shows an example of the configuration of a multicore fiber composed of triangular arrangements each composed of three types of cores with different propagation constants, and FIGS. 25B to 25D show examples in which the propagation constants of the cores are made different by using different refractive index differences, core diameters, and refractive index distributions. The core shown in FIG. 25B has the core diameter of $2a_1$, the refractive index of $n_1$, and the cladding refractive index of $n_2$. The core shown in FIG. 25C has the core diameter of $2a_2$, the refractive index of $n_3$, and the cladding refractive index of $n_2$. The core shown in FIG. 25D has the core diameter of $2a_3$, the peak refractive index of $n_4$, and the refractive index distribution with the cladding refractive index of $n_5$.

The inventor of the present invention proposed a heterogeneous uncoupled multicore fiber (MCF) that suppresses inter-core coupling and accommodates cores at high density by using multiple single mode cores with different relative refractive index differences of Δ (Non Patent Literature 3). In addition, the configuration in which optical guides with different optogeometrical characteristics are used is also proposed (Patent Literature 1).

FIG. 25A shows a multicore fiber composed of multiple cores that have different propagation constants and that are arranged in triangular lattice patterns. In this example, the core-to-core distance between neighboring heterogeneous cores with different propagation constants is Λ, and the core-to-core distance between homogeneous cores with the same propagation constants is D. Note that, in a triangular lattice pattern arrangement using three types of cores, there is the geometrical relation of $D=\sqrt{3}\times\Lambda$ between the heterogeneous core-to-core distance Λ and the homogeneous core-to-core distance D.

The following describes a conventional design procedure for an uncoupled multicore fiber of heterogeneous cores with reference to FIG. 26 to FIG. 28.

For the same core-to-core distance, the crosstalk between homogeneous cores is higher than the crosstalk between heterogeneous cores and, for the same crosstalk level, the homogeneous core-to-core distance D is larger than the heterogeneous core-to-core distance Λ. Especially, when the homogeneous core-to-core distance D is determined in a triangular arrangement of three types of cores so that the crosstalk level defined for the homogeneous cores is satisfied, the crosstalk between heterogeneous cores is decreased sufficiently lower than the defined crosstalk level.

FIG. 26 is a flowchart showing the design procedure for an uncoupled multicore fiber of heterogeneous cores.

The conventional design procedure for an uncoupled multicore fiber of heterogeneous cores is as follows. First, the procedure calculates the homogeneous core-to-core distance D based on the crosstalk target value defined between the homogeneous cores (S10) and, then, calculates the heterogeneous core-to-core distance Λ from the geometrical relation of the core arrangement (S11). After that, the procedure confirms that the calculated crosstalk level for the heterogeneous core-to-core distance Λ is smaller than the crosstalk target value that is set (S12).

FIG. 27 shows the procedure for determining the homogeneous core-to-core distance D in S10. In FIG. 27A, D is the distance between the homogeneous cores with the same relative refractive index difference of Δ. The condition for design requirement is that the coupling length $l_c$ between homogeneous cores is 5000 km when the crosstalk between homogeneous cores for the propagation distance of 100 km is set equal to or lower than −30 dB.

FIG. 27B shows the relation between the coupling length $l_c$ and the homogeneous core-to-core distance D where the core diameter 2a=5 μm and the relative refractive index difference Δ is 1.10%, 1.15%, 1.20%, 1.25%, and 1.30%.

The relation shown in FIG. 27B indicates that, when the relative refractive index difference Δ is 1.20%, the homogeneous core-to-core distance D, which satisfies the condition that coupling length $l_c$=5000 km or longer, is 40 μm.

FIG. 28 is a diagram showing crosstalk between heterogeneous cores and a core arrangement.

In FIG. 28A, the heterogeneous cores are arranged with the heterogeneous core-to-core distance Λ, determined by the homogeneous core-to-core distance D, between them. FIG. 28B shows the power conversion efficiency (also called the maximum power transfer efficiency) of heterogeneous cores. This figure shows the crosstalk for the relative refractive index different $Δ_2$ in terms of the power conversion efficiency F when the relative refractive index different $Δ_1$ is 1.15%, 1.20%, and 1.25%.

When the homogeneous core-to-core distance D is 40 μm, the heterogeneous core-to-core distance Λ in a triangular lattice arrangement is 23 μm (=40/√3). FIG. 28B shows the cases in which the heterogeneous core-to-core distance Λ is 10 μm, 15 μm, and 20 μm, indicating that the larger the heterogeneous core-to-core distance Λ is, the smaller the crosstalk is. If the difference in the relative refractive index differences Λ is 0.05% when the heterogeneous core-to-core distance Λ is 23 μm, the crosstalk becomes equal to or lower than −80 dB and therefore it is confirmed that the crosstalk setting value of −30 dB is satisfied.

CITATION LIST

Patent Literature

Patent Literature 1: U.S. Pat. No. 5,519,801

Non Patent Literature

Non Patent Literature 1: S. Inao, T. Sato, H. Hondo, M. Ogai, S. Sentsui, A. Otake, K. Yoshizaki, K. Ishihara, and N. Uchida, "High density multicore-fiber cable," Proceedings of the 28th International Wire & Cable Symposium (IWCS), pp. 370-384, 1979.

Non Patent Literature 2: B. Rosinski, J. W. D. Chi, P. Grasso, and J. L. Bihan, "Multichannel transmission of a multicore fiber coupled with Vertically-Coupled-Surface-Emitting Lasers," J. Lightwave Technol., vol. 17, no. 5, pp. 807-810, 1999.

Non Patent Literature 3: M. Koshiba, K. Saitoh, and Y. Kokubun, "Heterogeneous Multicore Fibers: Proposal and Design Principle," IEICE ELEX, vol, no. 2, pp. 98-103, January 2009.

Non Patent Literature 4: Tomozawa, Kokubun, "Maximum number of cores in heterogenuous uncoupled multicore fibers", Proceedings of the IEICE General Conference in 2010, The Institute of Electronics, Information and Communication Engineers, C-3-25 (March in 2010)

Non Patent Literature 5: K. Tomozawa, Y. Kokubun, "Maximum core capacity of heterogeneous uncoupled multicore fibers," 15th Optoelectronics and Communications Conference (OECC2010), Sapporo, 7C2-4, July 2010.

SUMMARY OF INVENTION

Technical Problem

The conventional core arrangement in a heterogeneous uncoupled multicore fiber is based on the periodic arrangement of a symmetric configuration such as a triangular arrangement or a rectangular arrangement. In the triangular arrangement of three types of heterogeneous cores in the configuration shown in FIG. 28, the homogeneous core-to-core distance D that sets the coupling ratio between the homogeneous cores equal to or less than −30 dB for 100 Km is 40 μm and the heterogeneous core-to-core distance Λ that sets the coupling ratio between heterogeneous cores to −30 dB is about 13 μm when the relative refractive index difference Δ is 1.20%, 1.25%, and 1.30%. Because the homogeneous core-to-core distance is three times larger, there is a need for increasing the types of heterogeneous cores to increase the core density (Non Patent Literatures 4 and 5).

In view of the foregoing, it is an object of the present invention to solve the problems with the conventional art and to increase the density of a multicore fiber without increasing the types of heterogeneous cores.

Solution to Problem

In an uncoupled multicore fiber that uses a plurality of single mode cores including homogeneous cores having the same propagation constant and heterogeneous cores having different propagation constants or a plurality of single mode cores including only homogeneous cores having the same propagation constant, the present invention varies the propagation constants of the homogeneous cores, which have the same propagation constant, by different amounts via a perturbation and suppresses coupling between the homogeneous cores via the variation in the homogeneous cores. Suppressing coupling between the homogeneous cores in this way reduces the distance between the homogeneous cores, thus allowing the density of the cores of the multicore fiber to be increased without increasing the types of heterogeneous cores. In the description below, an uncoupled multicore fiber is denoted as a multicore fiber.

For homogeneous cores, the multicore fiber of the present invention provides a perturbation part between a homogeneous core and another homogeneous core nearest to that homogeneous core. The perturbation part refers to a part that generates perturbations.

This perturbation part, located near homogeneous cores, gives different perturbations to propagation constants of the homogeneous cores to vary the propagation constants of the homogeneous cores from original propagation constants by different amounts, allows the propagation constants to have different values and, thereby, decreases coupling between the homogeneous cores.

The positions of homogeneous cores, for which a perturbation part is provided, are that, between a homogeneous core and another homogeneous core nearest to that homogeneous core, the distance between the homogeneous cores is such that the perturbation to both homogeneous cores causes a change large enough to generate differences in the propagation constants.

The cores configuring a multicore fiber may be not only a combination of a plurality of cores including homogeneous cores having the same propagation constant and heterogeneous cores having different propagation constants but also a combination of a plurality of cores including only homogeneous cores having the same propagation constant.

The present invention provides a multicore fiber in which a plurality of single mode cores are stored in one optical fiber wherein the multicore fiber has a lattice-point arrangement in which a plurality of lattice points, which have translational symmetry and rotational symmetry or one of translational symmetry and rotational symmetry, are periodically arranged two-dimensionally in a cross section of the fiber, the plurality of cores are arranged with lattice points of the lattice-point arrangement as reference positions, and the perturbation part, arranged between homogeneous cores, gives different perturbations to propagation constants of the cores to vary the propagation constants of the cores from original propagation constants.

The variation in the propagation constants generates a state in which the coupling amount between the cores, which is determined by the varied propagation constants, falls below a predetermined setting amount. The predetermined setting amount is a crosstalk that places the state of coupling between cores in the incomplete coupled state. With this setting amount as the threshold, the coupling state between cores is distinguished between the coupled state and the incomplete coupled state in a general sense.

For example, the setting amount may be set to −30 dB when the coupling ratio is low. The setting amount is not limited to −30 dB but may be set also to any value such as −10 dB, −20 dB, −40 dB, and so on.

Producing the state of coupling, in which the coupling amount between cores falls below a predetermined setting amount, allows the propagation constants of the neighboring cores to be made different from each other to make the core to core coupling uncoupled.

Note that "uncoupled" means "incompletely coupled state" in a general sense, which means a coupling state in which the coupling ratio is smaller than 1 but not completely 0, and that the coupling ratio is determined according to the setting amount described above.

In one mode of perturbation, the present invention provides, for each core, a perturbation part at a position shifted from a lattice point that is a reference position. A lattice point at a reference position may be a lattice point of a lattice-point arrangement. Providing a perturbation part at a position, shifted from a lattice point, gives a perturbation to the propagation constants of the homogeneous cores on both sides of the perturbation part and varies the propagation constants from the original propagation constants.

The perturbation part may be a heterogeneous core or a low refractive index region or a high refractive index region having a refractive index different from the refractive index of the cladding. The perturbation part gives different amounts of perturbation to the propagation constants of adjacent homogeneous cores and varies the propagation constants by different amounts to suppress coupling between the homogeneous cores.

One mode of a lattice-point arrangement is a triangular arrangement. In this mode of the lattice-point arrangement in a triangular arrangement, each lattice point is at an equal angle with, and at an equal distance to, six lattice points that are nearest to, and are arranged around, the lattice point.

Another mode of a lattice-point arrangement is a rectangular arrangement. In this mode of the lattice-point arrangement in a rectangular arrangement, the lattice points are periodically arranged in an x-axis direction and in a y-axis direction respectively.

[Heterogeneous Multicore Fiber]

The multicore fiber of the present invention may be configured by a combination of heterogeneous cores having different propagation constants and homogeneous cores having the same propagation constant. In the description below, a multicore fiber configured by a combination of heterogeneous cores and homogeneous cores is described using the name "heterogeneous multicore fiber". Propagation constants may be made different by changing the parameters such as a relative refractive index difference between a core and the cladding, a core diameter, and a refractive index distribution in a core.

The following describes a multicore fiber of the present invention using an example of a heterogeneous multicore fiber that includes heterogeneous cores having different relative refractive index differences and homogeneous cores having the same relative refractive index difference.

The heterogeneous multicore fiber has multiple modes in which, with the positions of lattice points, at which the cores are periodically arranged, as reference positions in the core arrangement in a triangular arrangement, cores are shifted from the reference positions so that different perturbations are given to the propagation constants of a pair of homogeneous cores that is the nearest pair of homogeneous cores. In each mode of perturbation, perturbation parts are arranged at the lattice points shifted from the reference positions of the lattice-point arrangement. Arranging the perturbation parts in this way varies the propagation constants of homogeneous cores by different amounts and, as a result, suppresses coupling between homogeneous cores.

In the triangular arrangement, a first mode of perturbation generated by the arrangement of perturbation parts is that the lattice-point arrangement is a triangular arrangement in which each lattice point is at an equal angle with, and at an equal distance to, six lattice points that are nearest to, and are arranged around, the lattice point, and three types of cores are triangularly arranged periodically with lattice points of the triangular arrangement as reference positions wherein propagation constants of the three types of cores are different because at least one of a relative refractive index difference from a cladding, a core diameter, and a refractive index distribution in a core is different.

The arrangement of the perturbation parts in the first mode forms a first core group, a second core group, and a third core group in the arrangement of the reference positions with the three types of triangularly-arranged nearest cores as a unit wherein the first core group is a core group in which the three types of cores are arranged at lattice points which are reference positions, the second core group is a core group in which the three types of cores are arranged at positions determined by shifting the three types of cores from lattice points, which are reference positions, in a direction of the inside or outside of the triangle arrangement, and the third core group is a core group in which the three types of cores are arranged at positions determined by shifting through rotation of the three types of cores from the lattice points, which are reference positions, around the center of the triangular arrangement.

In the triangular arrangement, a second mode of perturbation generated by the arrangement of perturbation parts is that, as in the first mode, the lattice-point arrangement is a triangular arrangement in which each lattice point is at an equal angle with, and at an equal distance to, six lattice points that are nearest to, and are arranged around, the lattice point, and three types of cores are triangularly arranged periodically with lattice points of the triangular arrangement as reference positions wherein propagation constants of the three types of cores are different because at least one of a relative refractive index difference from a cladding, a core diameter, and a refractive index distribution in a core is different.

The arrangement of the perturbation parts in the second mode in an arrangement of the reference positions is determined in such a way that core groups are formed each with the three types of triangularly-arranged nearest cores as a unit, the core groups are classified into three core groups in the triangular arrangement, the three types of cores of each of the core groups are rotated from lattice points around the center of the triangular arrangement and, at the same time, a rotation angle or a rotation direction of the perturbation parts is made different on a core group basis, and the perturbation parts are arranged at positions determined by shifting by the rotation.

In the triangular arrangement, a third mode of perturbation generated by the arrangement of perturbation parts is that, as in the first and second modes, the lattice-point arrangement is a triangular arrangement in which each lattice point is at an equal angle with, and at an equal distance to, six lattice points that are nearest to, and are arranged around, the lattice point, and three types of cores are triangularly arranged periodically with lattice points of the triangular arrangement as reference positions wherein propagation constants of the three types of cores are different because at least one of a relative refractive index difference from a cladding, a core diameter, and a refractive index distribution in a core is different.

The arrangement of the perturbation parts in the third mode in an arrangement of the reference positions is determined in such a way that core groups are formed each with the three types of triangularly-arranged nearest cores as a unit, the core groups are classified into three periodic core groups in the triangular arrangement, the three types of cores in each of the core groups are shifted in the center direction or an outward direction of the triangular arrangement and, at the same time, a shift amount of the perturbation parts is different on a core group basis, and the perturbation parts are arranged at positions determined by shifting by the shift.

In the triangular arrangement, a fourth mode of perturbation generated by the arrangement of perturbation parts is that the lattice-point arrangement is a triangular arrangement in which each lattice point is at an equal angle with, and at an equal distance to, six lattice points that are nearest to, and are arranged around, the lattice point, the plurality of cores are a combination of a plurality of types of cores whose propagation constants are different because at least one of a relative refractive index difference from a cladding, a core diameter, and a refractive index distribution in a core is different, and the plurality of types of cores are triangularly arranged periodically in a rotation symmetry direction of 60 degrees with lattice points of the triangular arrangement as reference positions.

The arrangement of each core of the perturbation parts in the fourth mode in an arrangement of the reference positions is determined in such a way that, from a lattice point that is the reference position of the core, the core is arranged at a position shifted in an x-axis direction and in a y-axis direction on a row basis and a column basis and, at the same time, a shift amount in the x-axis direction and the y-axis direction is made different on a row basis and a column basis wherein a direction of the extension line joining the nearest lattice points is selected as the x-axis direction, lattice points in the x-axis direction form a row, and lattice points in a direction +60 degrees or −60 degrees from the x-axis form a column.

The present invention has another mode of perturbation in which a region is provided whose propagation constant is different because at least one of a relative refractive index difference from a cladding, a core diameter, and a refractive index distribution in a core is different.

In the cores of the heterogeneous multicore fiber of the present invention, a perturbation part is arranged at a position shifted from a reference position. The perturbation part may be a heterogeneous core or a low refractive index region or a high refractive index region having a refractive index different from the refractive index of the cladding.

In the multicore configuration including a combination of heterogeneous cores and homogeneous cores, a lattice-point position is shifted from a reference position in each of the modes described above, and the lattice-point position shifted from the reference position is used as the arrangement position of a heterogeneous core. In this way, the position of the heterogeneous core is shifted from the reference position. The heterogeneous core arranged at the shifted position varies the propagation constants of the homogeneous cores adjacent to this heterogeneous core by different amounts. In this configuration, the heterogeneous core works as a perturbation part. The heterogeneous core has a propagation constant different from that of a homogeneous core because at least one of a relative refractive index difference from a cladding, a core diameter, and a refractive index distribution in a core is different.

In a multicore configuration including a combination of heterogeneous cores and homogeneous cores or a multicore configuration including homogeneous cores, a lattice-point position is shifted from a reference position in each of the modes described above, and the lattice-point position shifted from the reference position is used as the arrangement position of a low refractive index region or a high refractive index region. In this way, the position of the low refractive index region or the high refractive index region is shifted from the reference position. The low refractive index region or the high refractive index region arranged at the shifted position varies the propagation constants of a pair of homogeneous cores that is the nearest homogeneous cores, by different amounts. In this configuration, a region, which has a propagation constant different from that of the homogeneous cores because at least one of a relative refractive index difference between the low refractive index region core and the cladding, a core diameter, and a refractive index distribution in a core is different, works as a perturbation part.

A low refractive index region is a region having a refractive index lower than that of the cladding. When a low refractive index region is arranged between neighboring homogeneous cores, the low refractive index region varies the propagation constants of the homogeneous cores by different amounts to suppress coupling between the homogeneous cores.

A high refractive index region is a region having a refractive index higher than that of the cladding. When a high refractive index region is arranged between neighboring homogeneous cores, the high refractive index region varies the propagation constants of the homogeneous cores by different amounts to suppress coupling between the homogeneous cores.

A low refractive index region is a hole formed in the cladding between the cores in the fiber longitudinal direction, and the hole has therein an air layer or a member having a refractive index lower than the refractive index of the cladding. A high refractive index region is a hole formed in the cladding between the cores in the fiber longitudinal direction, and the hole has therein a member having a refractive index higher than the refractive index of the cladding.

The multicore configuration including homogeneous cores will be described in the paragraph of a homogeneous multicore fiber given below.

[Homogeneous Multicore Fiber]

The multicore fiber of the present invention may be configured by a combination only of homogeneous cores having the same propagation constant. In the description below, a multicore fiber configured by homogeneous cores only is described using the name "homogeneous multicore fiber".

The homogeneous multicore fiber has multiple modes in which, in the core arrangement in a triangular arrangement, the positions of lattice points at which cores are arranged periodically are shifted from the reference positions so that perturbations are given to the propagation constants of a pair of homogeneous cores that is the nearest homogeneous cores. In each mode of perturbation, perturbation parts are arranged at the lattice points shifted from the reference positions of the lattice-point arrangement. Arranging the perturbation parts in this way varies the propagation constants of homogeneous cores and, as a result, suppresses coupling between homogeneous cores.

In the triangular arrangement, a first mode of perturbation generated by the arrangement of perturbation parts is that the lattice-point arrangement is a triangular arrangement in which each lattice point is at an equal angle with, and at an equal distance to, six lattice points that are nearest to, and are arranged around, the lattice point, and the cores are triangularly arranged periodically with lattice points of the triangular arrangement as reference positions.

The arrangement of the perturbation parts in the first mode forms a first core group, a second core group, and a third core group in the arrangement of the reference positions with the three triangularly-arranged nearest cores as a unit wherein the first core group is a core group in which the three cores are arranged at lattice points which are reference positions, the second core group is a core group in which the three cores are arranged at positions determined by shifting the cores from lattice points, which are reference positions, in a direction of the inside or outside of the triangle arrangement, and the third core group is a core group in which the three cores are arranged at positions determined by shifting through rotation of the three cores from the lattice points, which are reference positions, around the center of the triangular arrangement.

In the triangular arrangement, a second mode of perturbation generated by the arrangement of perturbation parts is that the lattice-point arrangement is a triangular arrangement in which each lattice point is at an equal angle with, and at an equal distance to, six lattice points that are nearest to, and are arranged around, the lattice point, and three types of cores having different propagation constants are triangularly arranged with lattice points of the triangular arrangement as reference positions.

The arrangement of the perturbation parts in the second mode in an arrangement of the reference positions is determined in such a way that core groups are formed each with the three triangularly-arranged nearest cores as a unit, the core groups are classified into three core groups in the triangular arrangement, the three types of cores of each of the core groups are rotated from lattice points around the center of the triangular arrangement and, at the same time, a rotation angle or a rotation direction of the perturbation parts is made different on a core group basis, and the perturbation parts are arranged at positions determined by shifting by the rotation.

In the triangular arrangement, a third mode of perturbation generated by the arrangement of perturbation parts is that the lattice-point arrangement is a triangular arrangement in which each lattice point is at an equal angle with, and at an equal distance to, six lattice points that are nearest to, and are arranged around, the lattice point, and the homogeneous cores having the same propagation constant are triangularly arranged with the lattice points of the triangular arrangement as the reference points.

The arrangement of the perturbation parts in the third mode in an arrangement of the reference positions is determined in such a way that core groups are formed each with the three types of triangularly-arranged nearest cores as a unit, the core groups are classified into three periodic core groups in the triangular arrangement, the three types of cores in each of the core groups are shifted in the center direction or an outward direction of the triangular arrangement and, at the same time, a shift amount of the perturbation parts is made different on a core group basis, and the perturbation parts are arranged at positions determined by shifting by the shift.

In the cores of the homogeneous multicore fiber of the present invention, a perturbation part is arranged at a position shifted from a reference position. The perturbation part may be a low refractive index region or a high refractive index region.

In the multicore configuration including homogeneous cores, a lattice-point position is shifted in each of the modes described above, and the lattice-point position shifted from the reference position is used as the arrangement position of a low refractive-index core or a high refractive-index core. In this way, the position of the low refractive-index core or the high refractive-index core is shifted from the reference position. The low refractive-index core or the high refractive-index core arranged at the shifted position varies the propagation constants of the homogeneous cores adjacent to this low refractive-index core or the high refractive-index core by different amounts. In this configuration, the low refractive index region or the high refractive index region works as a perturbation part.

A low refractive index region is a region having a refractive index lower than that of the cladding. When a low refractive index region is arranged between a pair of homogeneous cores that is the nearest pair of homogeneous cores, the low refractive index region varies the propagation constants of the homogeneous cores to suppress coupling between the homogeneous cores. A high refractive index region is a region having a refractive index higher than that of the cladding. When a high refractive index region is arranged between a pair of homogeneous cores that is the nearest pair of homogeneous cores, the high refractive index region varies the propagation constants of the homogeneous cores to suppress coupling between the homogeneous cores.

In a homogeneous multicore fiber, a perturbation is generated by arranging a low refractive index region or a high refractive index region adjacent to a pair of homogeneous cores that is the nearest pair of homogeneous cores. A low refractive index region, which is formed along the fiber longitudinal direction, is a hole formed in the cladding between the cores in the fiber longitudinal direction, and the hole has therein an air layer or a member having a refractive index lower than the refractive index of the cladding. A high refractive index region, which is formed along the fiber longitudinal direction, is a hole formed in the cladding between the cores in the fiber longitudinal direction, and the hole has therein a member having a refractive index higher than the refractive index of the cladding.

Advantageous Effects of Invention

According to the present invention, in a multicore fiber that includes a plurality of single mode cores having different propagation constants, a perturbation part varies the propagation constants of homogeneous cores by different amounts to suppress coupling between the homogeneous cores as described above. Suppressing coupling between homogeneous cores in this way reduces the distance between which the homogeneous cores are arranged. Reducing the distance between which the homogeneous cores are arranged allows the density of cores in a multicore fiber to be increased without increasing the types of heterogeneous cores.

Increasing the core density via a perturbation according to the present invention is implemented by a simple configuration in which a heterogeneous core or a low refractive index region is arranged at a position shifted from a lattice-point position of a lattice-point arrangement having periodicity such as translational symmetry and rotational symmetry. This configuration allows the density of cores in a multicore fiber to be increased without increasing the types of heterogeneous cores.

BRIEF DESCRIPTION OF DRAWINGS

[FIG. 1]

FIG. 2 is a diagram showing mode coupling between the cores.

[FIG. 3]

FIG. 4 is a diagram showing the relation between the homogeneous core-to-core distance D and the coupling length $l_c$ for homogeneous cores.

[FIG. 5]

[FIG. 6]

[FIG. 7]

FIG. 8 is a flowchart showing an example of the procedure for generating different propagation constants via a perturbation in the present invention.

[FIG. 9] FIG. 9A-D is a diagram showing an example of the procedure for generating different propagation constants via a perturbation in the present invention.

FIG. 10 is a diagram showing an example in which three types of heterogeneous cores are arranged at lattice points arranged in a triangular arrangement (closest packed arrangement).

FIG. 11 is a diagram showing the relation between the power conversion efficiency and the shift amount of the core positions.

[FIG. 12]

FIG. 13 is a diagram showing an example in which three types of heterogeneous cores are arranged at the lattice points in a triangular arrangement (closest packed arrangement).

FIG. 14 is a diagram showing another example in which three types of heterogeneous cores are arranged at the lattice points in a triangular arrangement (closest packed arrangement).

FIG. 15 is a diagram showing an example in which two types of heterogeneous cores are arranged at lattice points arranged in a rectangular arrangement.

FIG. 16 is a diagram showing an example of the mode in which the heterogeneous cores in a rectangular arrangement are shifted.

[FIG. 17]

[FIG. 18]

FIG. 19 is a diagram showing the calculation result of the power conversion efficiency when the present invention is applied to a seven-core multicore fiber.

[FIG. 20]

[FIG. 21] FIG. 21 is a table showing the comparison between an example of the configuration of the present invention and an example of the conventional configuration.

FIG. 22 is a diagram showing an example of configuration of the second mode of the present invention.

[FIG. 23]

[FIG. 24]

FIG. 26 is a flowchart showing the design procedure for an uncoupled multicore fiber of heterogeneous cores.

[FIG. 27]

[FIG. 28]

REFERENCE SIGNS LIST

Figure 1A:
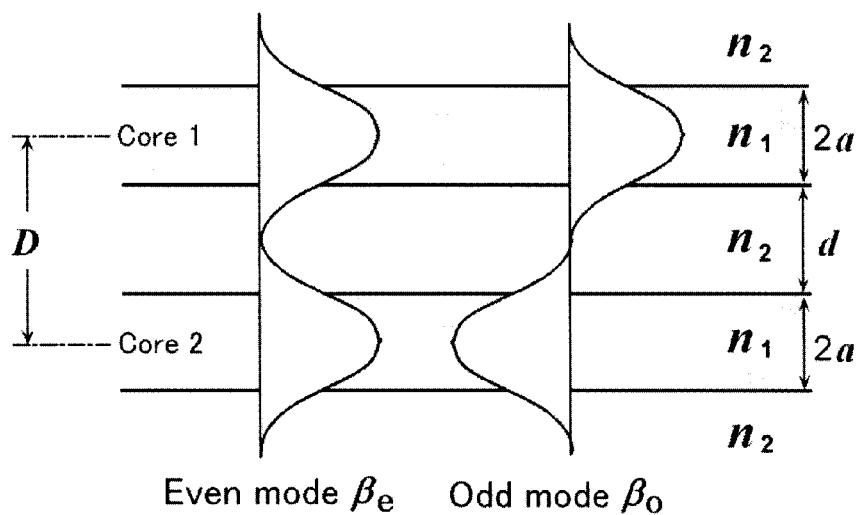
FIG. 1A-B is a diagram showing a simplest model for describing the inter-core coupling of a multicore fiber.

A Central core
B-G Surrounding core
D Homogeneous core-to-core distance
F Power conversion efficiency (crosstalk)
$F_0$ Specified power conversion efficiency (crosstalk)
P Low refractive index region
Λ Heterogeneous core-to-core distance
Description of Embodiment Embodiments of the present invention will be described in detail below with reference to the drawings.

The present invention relates to a multicore fiber that uses multiple single mode cores composed of heterogeneous cores with different propagation constants and homogeneous cores with the same propagation constant or that uses multiple single mode cores composed of only the homogeneous cores with the same propagation constant. The present invention varies the propagation constants of homogeneous cores, which have the same propagation constant, via a perturbation and suppresses the coupling between the homogeneous cores by varying the propagation constants of the homogeneous cores, thus reducing the homogeneous core-to-core distance for increasing the density of the multicore fiber.

The following describes the outline of how a propagation constant is varied by a perturbation in the present invention with reference to FIGS. 1-9 and describes an example of the configuration of a multicore fiber with reference to FIG. 10 to FIG. 22.

The two modes of perturbations are described. In the first mode of perturbations, heterogeneous cores are placed at positions shifted from the periodically arranged lattice point positions to cause perturbations. An example of the configuration based on the first perturbations is described with reference to FIG. 10 to FIG. 20. In the second perturbations, low refractive index regions such as air holes are provided at positions shifted from the periodically arranged lattice points to cause perturbations. An example of the configuration based on the second mode of perturbations is described with reference to FIG. 21.

In the examples of the configurations in FIG. 9 to FIG. 19, the examples of configurations using large refractive index difference cores are described in FIG. 10 to FIG. 15, and the example of configurations using small refractive index difference cores are described in FIG. 16 to FIG. 19. Although heterogeneous cores are represented by circles, triangles, and squares in FIG. 10, FIG. 13, and FIG. 14 to allow the heterogeneous cores to be distinguished easily, the cores have usually a circular cross section.

[1. Outline of Variations in Propagation Constant by Perturbations in the Present Invention]

The following describes the outline of how propagation constants are varied by perturbations in the present invention.

According to the present invention, the propagation constants of homogeneous cores are varied by perturbations to cause different propagation constants of the homogeneous cores to separate each other to allow them to be placed in the incomplete coupled state for suppressing the coupling. The propagation constants may be varied in the first mode, in which heterogeneous cores are placed at positions, shifted from the symmetrically arranged lattice point positions, as perturbation parts or in the second mode in which low refractive index regions such as an air hole are provided at positions, shifted from the symmetrically arranged lattice points, as perturbation parts. In this case, the symmetry includes translational symmetry or rotational symmetry or both.

In the present invention, a perturbation varies the propagation constants of homogeneous cores when a perturbation-causing region, such as a heterogeneous core or a low refractive index part, is placed at a position shifted from periodically arranged reference positions. By giving different variations to the propagation constants of a pair of homogeneous cores that is the nearest pair of homogeneous cores, the propagation constants of the homogeneous cores, which have the same propagation constant before perturbation, separate each other and therefore the coupling between the cores is suppressed.

In both a heterogeneous multicore fiber and a homogeneous multicore fiber, the perturbation part produces different amounts of perturbation for each of the homogeneous cores to vary the propagation constant, thus causing the different propagation constants of the homogeneous cores to separate each other. The present invention is applicable to both a heterogeneous multicore fiber and a homogeneous multicore fiber. As described above, a heterogeneous multicore fiber is a multicore fiber composed of a combination of heterogeneous cores and homogeneous cores, and a homogeneous multicore fiber is a multicore fiber composed of only homogeneous cores.

The following describes an example with focus on a heterogeneous multicore fiber.

Figure 1B:
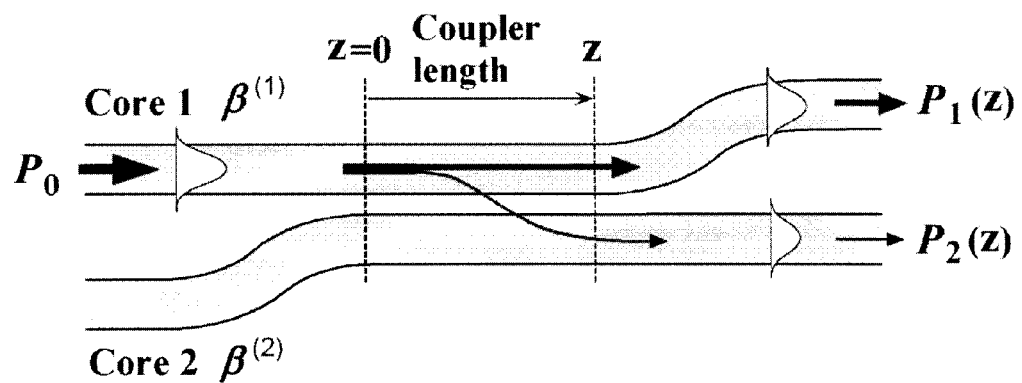

First, inter-core coupling is described. FIG. 1 shows a simplest model for describing the inter-core coupling of a multicore fiber.

Figure 2:
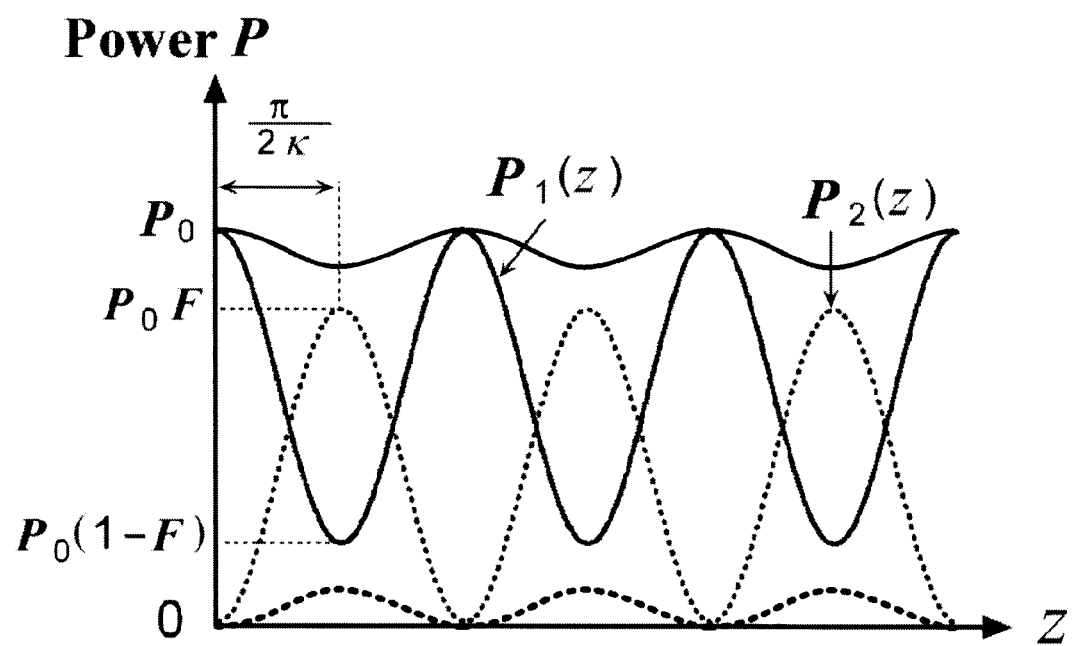
[FIG. 2]

When there are two single mode waveguide cores and the cores are placed in close proximity to each other, mode coupling is generated between the cores as shown in FIG. 2. FIG. 2 is a diagram showing mode coupling between the cores.

Let $\beta^{(1)}$ and $\beta^{(2)}$ be the propagation constants of the basic modes respectively in an uncoupled system in which each of the two cores is present alone. Then, when these cores are arranged in parallel to the propagation direction (z direction), the propagation constants $\beta_e$ and $\beta_o$ of the coupled modes e and o in the coupled system are given respectively as $\beta_e = \beta_{ave} + \kappa$ and $\beta_o = \beta_{ave} - \kappa$. In this case, $\beta_{ave} = (\beta^{(1)} + \beta^{(2)})/2$ is the average propagation constant, and the beat wavenumber $\kappa$ is represented as $\kappa = (\delta^2 + |K_{12}|^2))^{1/2}$ using the phase mismatching amount $\delta = (\beta^{(1)} - \beta^{(2)})/2$ and the coupling coefficient $|K_{12}|$.

When inter-core coupling is performed in complete coupled mode via symmetric coupling, the coupling length lc is represented as follows:

$$l_c = \pi/(\beta_e - \beta_o) \qquad (1)$$

When inter-core coupling is performed in incomplete coupled mode via asymmetric coupling, the output powers $P_1$ and $P_2$ are represented by the following expression based on the mode coupling theory shown in FIG. 2.

$$P_1(z) = P_0 \cdot (1 - F \sin^2(\kappa z)) \qquad (2)$$

$$P_2(z) = P_0 \cdot (F \sin^2(\kappa z)) \qquad (3)$$

The power conversion efficiency F is represented by the following expression where $\beta^{(1)} \ne \beta^{(2)}$ and input power $P_0 = 1$.

$$F = 1/(1 + ((\beta^{(1)} - \beta^{(2)})/2|K_{12}|)^2) \qquad (4)$$

$$\kappa = (((\beta^{(1)} - \beta^{(2)})/2)^2 + |K_{12}|^2)^{1/2} \qquad (5)$$

When symmetric coupling is performed with $\beta^{(1)} = \beta^{(2)}$ in expression (5), the beat wavenumber $\kappa$ is as follows.

$$\kappa = (((\beta^{(1)} - \beta^{(2)})/2)^2 + |K_{12}|^2)^{1/2} \qquad (6)$$
$$= |K_{12}|$$

From expression (3), there is the condition $\kappa l_c = \pi/2$, the coupling length $l_c$ has the following relation.

$$l_c = \pi/2\kappa = \pi/2|K_{12}| \qquad (7)$$

By comparing the coupling length $l_c$ ($=\pi/2|K_{12}|$) based on the weakly wave guiding theory represented by expression (7) with the coupling length $l_c$ based on the exact theory represented by expression (1), the coupling coefficient $|K_{12}|$ is represented by the following expression.

$$|K_{12}| = (\beta_e - \beta_o)/2 \qquad (8)$$

The power conversion efficiency F represents the magnitude of crosstalk between cores. To satisfy the condition $F < F_0$ indicating that the power conversion efficiency F is smaller than a crosstalk $F_0$ specified in a predetermined manner, the following relation must be satisfied.

$$\beta^{(1)} - \beta^{(2)} \ge ((1 - F_0)/F_0)^{1/2} \times (2|K_{12}|) \qquad (9)$$

For example, when the crosstalk $F_0$ specified in a predetermined manner is $10^{-3}$ (−30 dB), the following must be satisfied.

$$\beta^{(1)} - \beta^{(2)} \ge (999)^{1/2} \times (2|K_{12}|) \qquad (10)$$

FIG. 2 shows the variation state of the output powers $P_1$ and $P_2$ of the cores 1 and 2. By reducing the power conversion efficiency F, the output power $P_1$ varies in the neighborhood of $P_0$ and the output power $P_2$ varies in the neighborhood of 0. This indicates that the inter-core coupling state is weak and that the crosstalk is small.

Figure 3A:
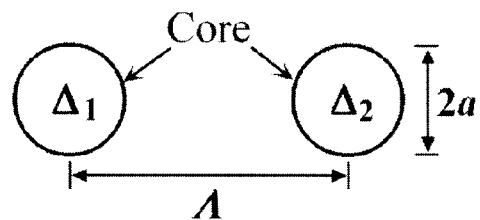
FIG. 3A-B is a diagram showing crosstalk between heterogeneous cores when cores are arranged in a triangular arrangement (closest packing).
Figure 3B:
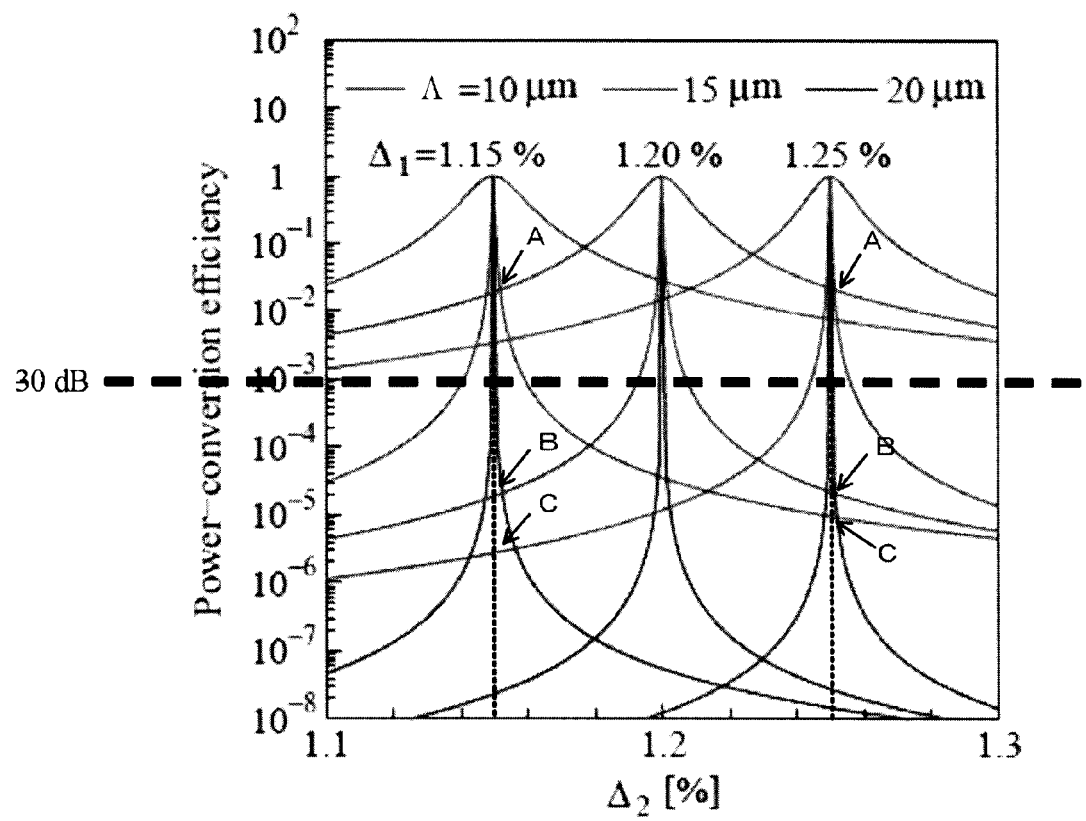

FIG. 3 is a diagram showing crosstalk between heterogeneous cores when the cores are arranged in a triangular arrangement (closest packing). FIG. 3A shows the state in which the heterogeneous cores, whose relative refractive index differences Δ are $Δ_1$ and $Δ_2$ respectively, are spaced the distance Λ apart. In FIG. 3B, the vertical axis indicates the power conversion efficiency F, the horizontal axis indicates the relative refractive index difference $Δ_2$, and the curve uses the relative refractive index difference $Δ_1$ and the distance Λ as the parameters. The propagation constants of the cores differ when the relative refractive index differences differ.

FIG. 3B indicates crosstalk that is generated in the following cases. For example, when cores, whose difference in the relative refractive index difference Δ is 0.05%, are applied to a core with the relative refractive index difference $Δ_1$=1.20% (that is, $Δ_1$=1.15%, 1.25%), the crosstalk is at the level indicated by point A in the figure when the heterogeneous core-to-core distance Λ is 10 μm, the crosstalk is at the level indicated by point B in the figure when the heterogeneous core-to-core distance Λ is 15 μm, and the crosstalk is at the level indicated by point C in the figure when the heterogeneous core-to-core distance Λ is 20 μm.

This means that reducing the crosstalk to a level equal to or lower than −30 dB requires that the heterogeneous core-to-core distance Λ be 13 μm that is between 10 μm and 15 μm. In FIG. 3, a curve for the heterogeneous core-to-core distance Λ is 13 μm is not shown.

Next, based on the relation described above, the following describes a deviation in the propagation constants, required to reduce crosstalk between homogeneous cores 1 and 2 to a predetermined magnitude or smaller, using a numerical example.

When cores are arranged in a triangular arrangement using three types of cores, there is the following relation between the heterogeneous core-to-core distance Λ and the homogeneous core-to-core distance D.

$$D=\sqrt{3}\times Λ \quad (11)$$

Therefore, when the heterogeneous core-to-core distance Λ 13 μm, the homogeneous core-to-core distance D is 22.5 μm.

Figure 4:
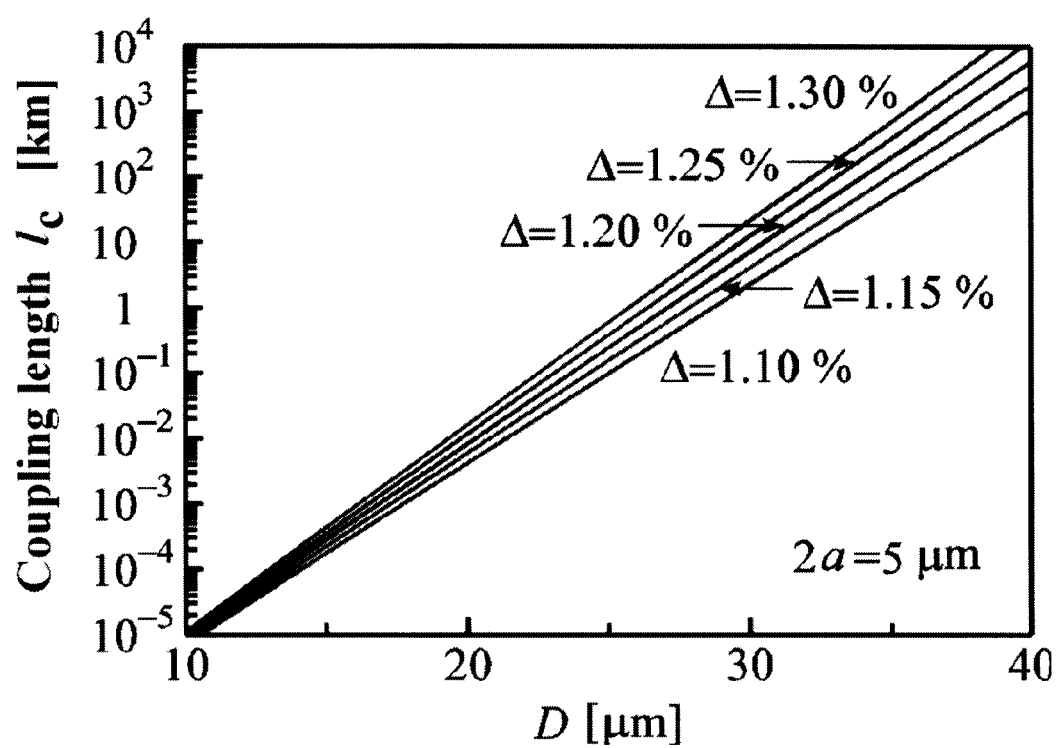
[FIG. 4]

FIG. 4 shows the relation between the homogeneous core-to-core distance D and the coupling length $l_c$ for homogeneous cores. FIG. 4 shows that the coupling length $l_c$ corresponding to the homogeneous core-to-core distance D=22.5 μm, is 50 m for Δ=1.2%.

Substituting the values of the homogeneous core-to-core distance D=22.5 μm and the coupling length $l_c$=50 min expression (7) gives the coupling coefficient $|K_{12}|$ as follows.

$$|K_{12}|=π/2l_c=3.14\times10^{-2} \text{rad/m} \quad (12)$$

Therefore, from the calculated value of the coupling coefficient $|K_{12}|$ and expression (9), the condition for the difference in the propagation constant necessary for reducing the crosstalk (power conversion efficiency) to $F_0$ or lower is represented by expression (13) given below.

$$β^{(1)}-β^{(2)}\geq((1-F_0)/F_0)^{1/2}\times(6.28\times10^{-2})\text{rad/m} \quad (13)$$

Expression (13) represents the deviation $(β^{(1)}-β^{(2)})$ of the propagation constant necessary for reducing crosstalk between homogeneous cores to $F_0$ or lower.

When (−30 dB) is set as the crosstalk $F_0$, expression (13) is represented by expression (14) as follows.

$$β^{(1)}-β^{(2)}\geq(999)^{1/2}\times(2|K_{12}|)=1.986\text{rad/m} \quad (14)$$

The value of the propagation constant $β^{(1)}$ is approximately the value represented by the expression given below.

$$β^{(1)}=(2π/λ)\times neq\approx5.88\times10^{6}\text{rad/m} \quad (15)$$

Therefore, by generating a perturbation for the propagation constant so that the ratio of the deviation in the propagation constant to the propagation constant becomes approximately $3.4\times10^{-7}$, the crosstalk between homogeneous cores may be reduced to a predetermined level or lower.

According to the present invention, a perturbation is generated for the propagation constant of a homogeneous core so that the deviation in the propagation constant becomes a value equal to or higher than the value represented by expression (13) in which the crosstalk $F_0$ is used as the parameter. By doing so, the distance between homogeneous cores whose propagation constants before the perturbation are the same is reduced and, thus, the density of a multicore fiber is increased.

Next, the following describes a perturbation that causes a deviation in propagation constants in the present invention with reference to FIGS. 5 and 6. FIG. 5 is a diagram showing perturbations in the present invention, and FIG. 6 is a diagram showing how propagation constants are changed by a perturbation. The symbol o shown in FIG. 5 indicates a core with the relative refractive index difference $Δ_1$ or $Δ_2$ or an air hole with a low refractive index. The core or the air hole is surrounded by the cladding. By using not only a different relative refractive index difference but also a different core diameter or a different refractive index distribution in the core, a perturbation part is able to give different amounts of perturbation to the propagation constants of a pair of homogeneous cores that is the pair of homogeneous cores nearest to the perturbation part and, via the perturbation, give a deviation.

Figure 5A:
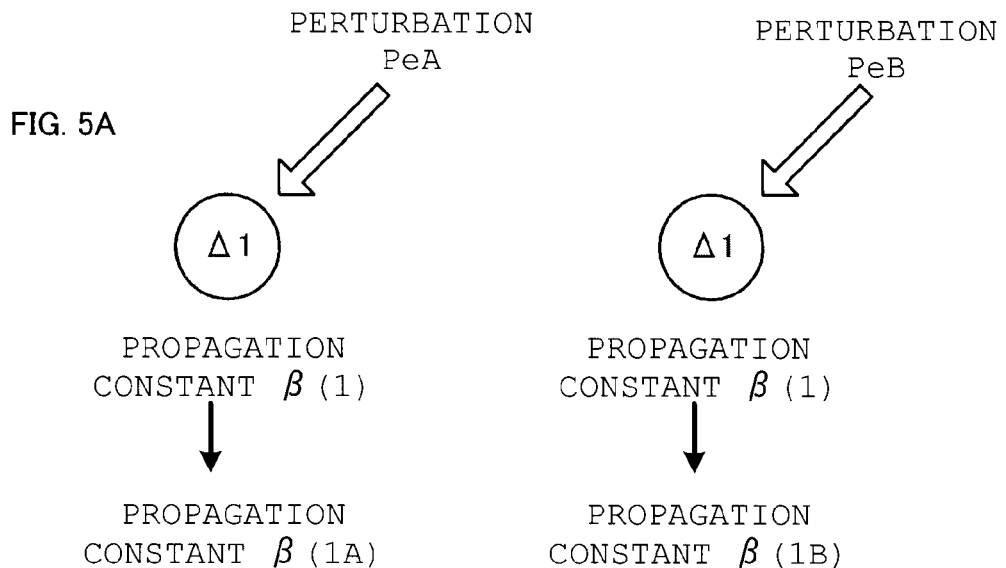
FIG. 5A-C is a diagram showing perturbations in the present invention.

The cores shown in FIG. 5A are homogeneous cores with the same relative refractive index difference $Δ_1$ and the same core diameter, and have the same propagation constant $β^{(1)}$. The perturbation parts, not shown, give a perturbation to both homogeneous cores, change the propagation constants β via this perturbation, and cause a deviation in the propagation constants of both homogeneous cores. In FIG. 5A, a perturbation PeA changes the propagation constant $β^{(1)}$ to the propagation constant $β^{(1A)}$, and a perturbation PeB changes the propagation constant $β^{(1)}$ to the propagation constant $β^{(1B)}$. Using the perturbations PeA and PeB, which are different from each other, causes a deviation between the propagation constant $β^{(1A)}$ and the propagation constant $β^{(1B)}$.

Figure 5B:
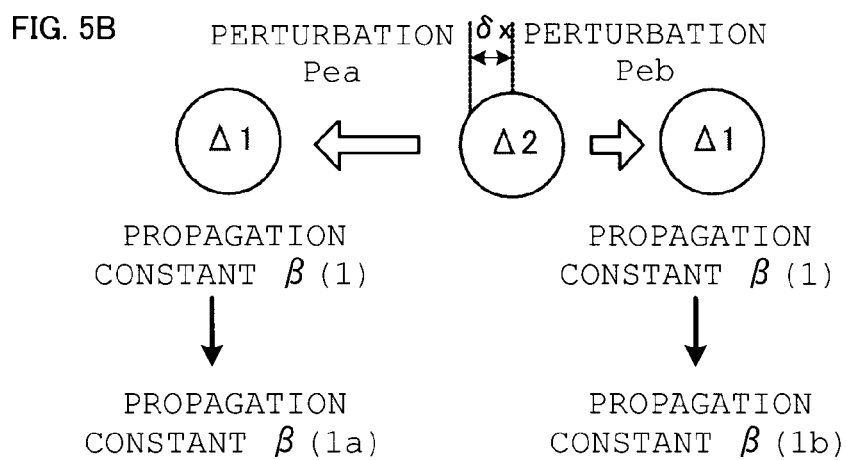
Figure 5C:
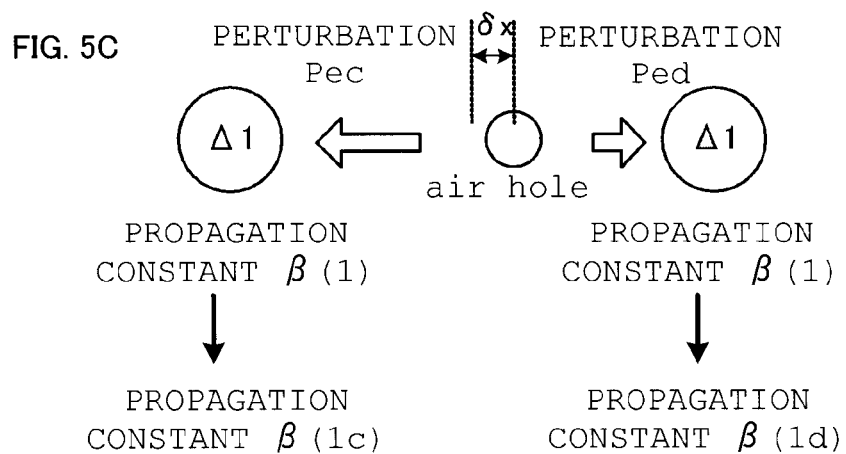

FIG. 5B is a diagram showing a perturbation in the first mode, and FIG. 5C is a diagram showing a perturbation in the second mode.

In the first mode of perturbation, a heterogeneous core with a different relative refractive index difference Δ is placed as the perturbation part to give a perturbation to the homogeneous cores. By making different the distances between the homogeneous core and the heterogeneous core, the changes in the propagation constants β caused by the perturbation become different with the result that a deviation is caused in the propagation constants of the homogeneous cores.

In FIG. 5B, a heterogeneous core with a different relative refractive index difference Δ (relative refractive index difference $Δ_2$) is placed between the neighboring homogeneous cores (relative refractive index difference $Δ_1$). In this case, the heterogeneous core is placed at the position shifted δx from the intermediate position of both homogeneous cores to the side of one of the homogeneous cores. The propagation constant of the left-side homogeneous core in FIG. 5B is changed from $β^{(1)}$ to $β^{(1a)}$ by the perturbation Pea received from the heterogeneous core, and the propagation constant of the right-side homogeneous core is changed from $β^{(1)}$ to $β^{(1b)}$ by the perturbation Peb received from the heterogeneous core. Note that a and b schematically show the difference in perturbation caused by the position where the heterogeneous core is placed.

As described above, because a change in the propagation constant caused by a perturbation depends on the distance from the heterogeneous core, a deviation can be caused between the changed propagation constants $\beta^{(1a)}$ and $\beta^{(1b)}$ by shifting the placement position of the heterogeneous core from the intermediate position of the homogeneous cores.

In the second mode of perturbation, a low refractive index region is placed as the perturbation part to give a perturbation to the homogeneous cores. By making different the distances between the homogeneous core and the low refractive index region, the changes in the propagation constants $\beta$ caused by the perturbation become different with the result that a deviation is caused in the propagation constants of the homogeneous cores. The low refractive index region, for example, a region with a refractive index lower than that of the cladding, may be configured by an air hole in the cladding.

In FIG. 5C, a low refractive index region, such as an air hole with a refractive index lower than that of the cladding, is placed between the neighboring homogeneous cores (relative refractive index difference $\Delta_1$) as the perturbation part. In this case, the low refractive index region is placed at the position shifted $\delta x$ from the intermediate position of both homogeneous cores to the side of one of the homogeneous cores. The propagation constant of the left-side homogeneous core in FIG. 5C is changed from $\beta^{(1)}$ to $\beta^{(1c)}$ by the perturbation Pec received from the low refractive index part, and the propagation constant of the right-side homogeneous core is changed from $\beta^{(1)}$ to $\beta^{(1d)}$ by the perturbation Ped received from the low refractive index region. Note that c and d schematically show the difference in perturbation caused by the position where the low refractive index region is placed.

As described above, because a change in the propagation constant caused by a perturbation depends on the distance from the low refractive index region, a deviation can be caused between the changed propagation constants $\beta^{(1c)}$ and $\beta^{(1d)}$ by shifting the placement position of the low refractive index region from the intermediate position of the homogeneous cores.

Generating a perturbation to cause a deviation in the propagation constants of the homogeneous cores reduces the distance between the homogeneous cores with the same relative refractive index difference $\Delta$, thus increasing the density of a multicore fiber.

The propagation constant $\beta$ affected by a perturbation is represented by the following expressions of first-order perturbation (16) and (17).

$$\beta^2 = \beta_0^2 + \frac{k_0^2 \int\int_\infty \delta n^2(x,y)|E_0(x,y)|^2 \, dxdy}{\int\int_\infty |E_0(x,y)|^2 \, dxdy} \quad (16)$$

$\delta n^2(x,y) = n_1^2 - n_2^2$ (in heterogeneous core(region with refractive index different from that of cladding)) = 0 (out of heterogeneous core(region with refractive index different from that of cladding)) (17)

As shown in expressions (16) and (17) because $\delta n^2$ (x, y) is used as the parameter and the electric field distribution $E_0$(x, y) is attenuated in the cladding approximately as an exponential function of the distance from the core, the propagation constant $\beta$ affected by the perturbation depends on the distance from the homogeneous core to the heterogeneous core or to the low refractive index region. Therefore, the value of the propagation constant $\beta$ differs according to the placement position of the heterogeneous core or the low refractive index region with respect to the homogeneous cores. In the configuration in which a heterogeneous core or a low refractive index region is placed between the neighboring homogeneous cores, the right-side and left-side homogeneous cores receive different perturbations depending upon the distance to the heterogeneous core or to the low refractive index region and therefore have different propagation constants.

FIG. 6 is a diagram showing the outline of a difference in the propagation constants that depends on the placement position of a heterogeneous core or a low refractive index region.

Figure 6A:
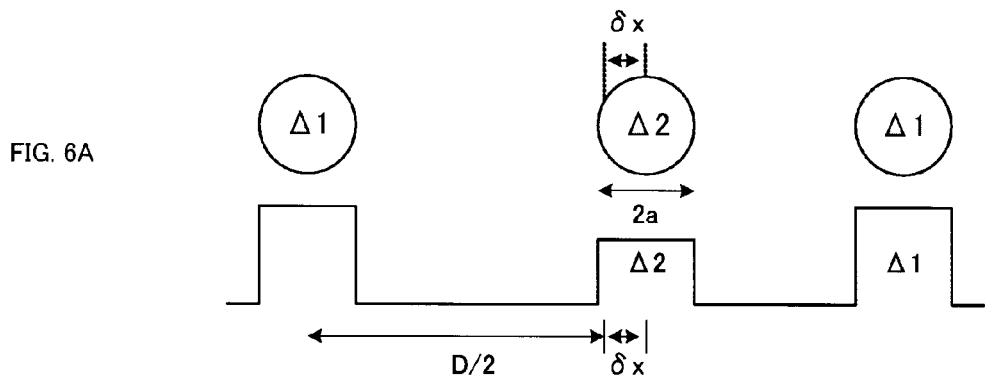
FIG. 6A-G is a diagram showing how propagation constants are changed by a perturbation in the present invention.
Figure 6B:
Figure 6C:
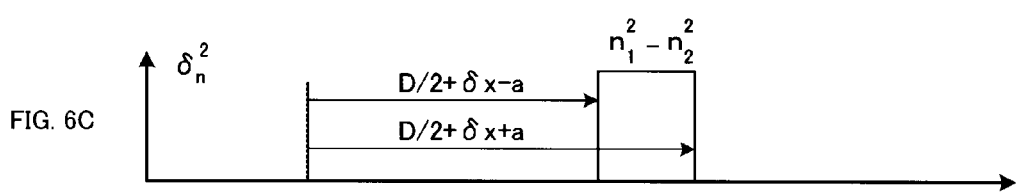
Figure 6D:
Figure 6E:
Figure 6F:
Figure 6G:

The propagation constant $\beta$ affected by a perturbation is represented by the integration of the product of $\delta n^2$ (x, y) and the electric field $|E_0|^2$ as shown by expression (16). FIG. 6A schematically shows the distribution of the relative refractive index differences $\Delta$ of homogeneous cores and a heterogeneous core, FIGS. 6B, 6C and 6D schematically show the electric field $|E_0|^2$, $\delta n^2$, and the integration value when viewed from the left-side homogeneous core, and FIGS. 6E, 6F, and 6G schematically show the electric field $|E_0|^2$, $\delta n^2$, and the integration value when viewed from the right-side homogeneous core. Although the values are represented linearly in the x-axis direction assuming that a planar waveguide is used, the electromagnetic field distribution in the basic mode of an optical fiber has approximately a similar form and, therefore, the principle of perturbation can be described using the similar diagrams.

The integration values represented in FIG. 6D and FIG. 6G, which depend on the position of $\delta n^2$ (x, y), and are represented as the difference in the propagation constants $\beta$.

As described above, shifting the placement position of a heterogeneous core or a low refractive index region with respect to the neighboring homogeneous cores generates different perturbations to the homogeneous cores and causes a deviation in the propagation constants of the homogeneous cores.

A change in the propagation constants generated via a perturbation is applicable not only to the homogeneous cores in a heterogeneous core multicore fiber in which heterogeneous cores are used but also to a homogeneous core multicore fiber in which homogeneous cores are used.

Figure 7A:
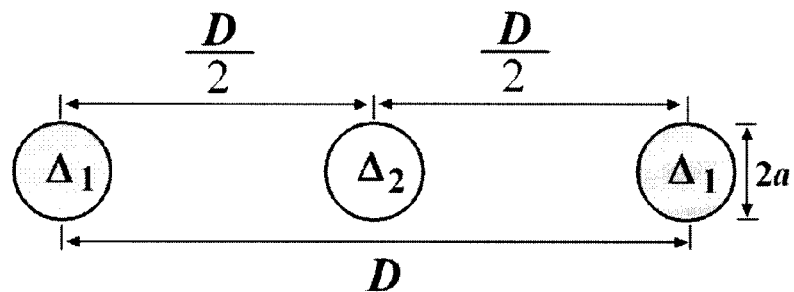
FIG. 7A-C is a diagram showing the outline of the placement of a heterogeneous core for generating a perturbation in the present invention.

FIG. 7 is a diagram showing the outline of the placement of a heterogeneous core for generating a perturbation in the present invention. FIG. 7A shows the conventional arrangement of homogeneous cores and a heterogeneous core. In this core arrangement, the homogeneous cores with the relative refractive index difference $\Delta_1$ are placed with the distance D between them, and the heterogeneous core with the relative refractive index difference $\Delta_2$ is placed at the intermediate position of the homogeneous cores with the equal distance D/2 to both homogeneous cores.

Figure 7B:
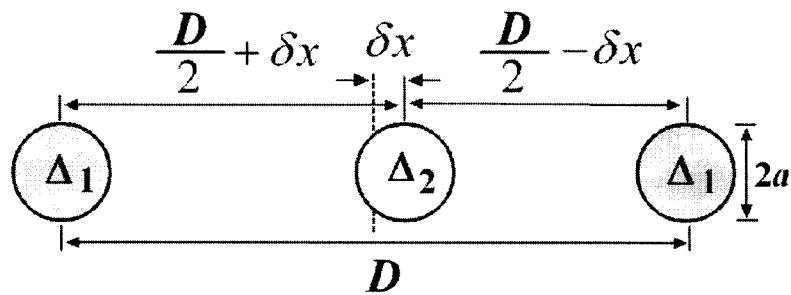

On the other hand, FIG. 7B shows the arrangement of homogeneous cores and a heterogeneous core in the present invention. In this core arrangement, the homogeneous cores with the relative refractive index difference $\Delta_1$ are placed with the distance D between them, and the placement position of the heterogeneous core with the relative refractive index difference $\Delta_2$ is shifted from the intermediate position of the homogeneous cores by $\delta x$. By shifting the position in this way, the distance between the left-side homogeneous core and the heterogeneous core becomes (D/2+$\delta x$) and the distance between the right-side homogeneous core and the heterogeneous core becomes (D/2−$\delta x$).

Figure 7C:
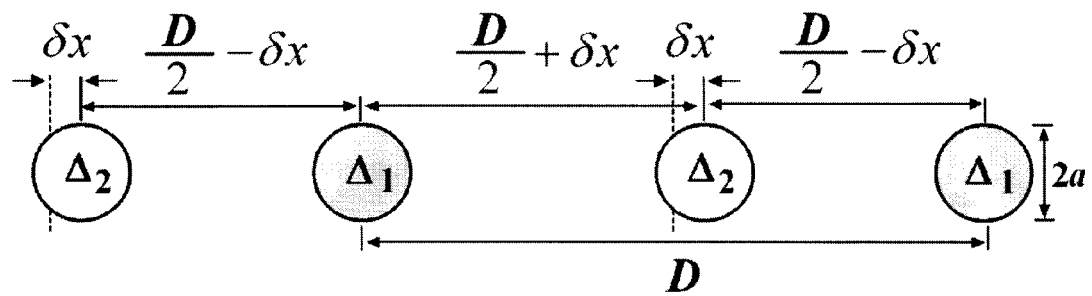

FIG. 7C shows the case in which the heterogeneous cores, which are arranged one dimensionally at the same periodic interval and on the same axis as that of the homogeneous cores that are arranged one dimensionally at a periodic interval, are shifted uniformly. When the heterogeneous cores are shifted uniformly in this way, the amounts of change in distance from the heterogeneous core to the homogeneous cores on both sides are equal but their signs are opposite. This means that the changes in the propagation constants generated by a perturbation for the homogeneous core are offset with no deviation to the propagation constants. To solve this problem, the shift direction of the heterogeneous cores is alternated to prevent a perturbation to the homogeneous core from being offset.

(Procedure for Generating Different Propagation Constants Via Perturbation)

Figure 8:
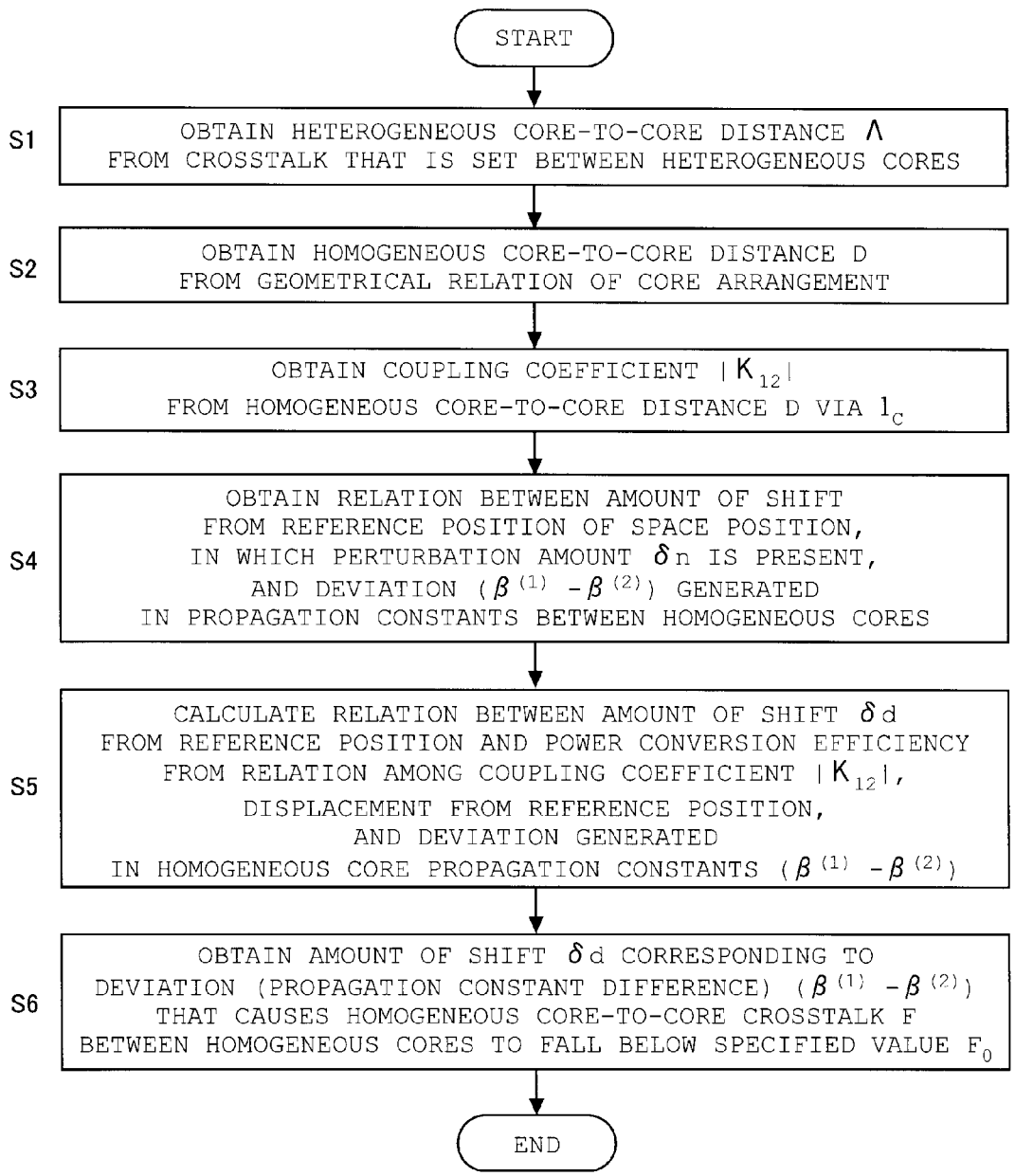
[FIG. 8]

Next, the following describes an example of the procedure for generating different propagation constants via a perturbation in the present invention with reference to the flowchart in FIG. 8 and the diagram in FIG. 9.

First, the heterogeneous core-to-core distance $\Lambda$ is obtained from the power conversion efficiency (crosstalk) $F_0$ that is specified between the heterogeneous cores (S1). For the heterogeneous cores with the relative refractive index difference $\Delta_1$ and the relative refractive index difference $\Delta_2$, FIG. 9A shows the curves for the relative refractive index difference $\Delta_1$, where the horizontal axis indicates the relative refractive index difference $\Delta_2$ and the vertical axis indicates the power conversion efficiency (crosstalk) F. The figure shows a group of curves that differ according to the heterogeneous core-to-core distance $\Lambda$.

From these relations, the heterogeneous core-to-core distance $\Lambda$ is obtained based on the relative refractive index difference $\Delta_1$ and the relative refractive index difference $\Delta_2$ of the heterogeneous cores and the power conversion efficiency (crosstalk) $F_0$ that is specified. In FIG. 9A, a curve that passes through the intersection of the two broken lines is obtained from the group of curves for the relative refractive index difference $\Delta_1$, and the heterogeneous core-to-core distance $\Lambda$ is obtained from the obtained curve.

The homogeneous core-to-core distance D corresponding to the heterogeneous core-to-core distance $\Lambda$, obtained in S1, is calculated geometrically from the core arrangement (S2). FIG. 9B shows an example of an arrangement in which three types of cores are arranged at the lattice points arranged periodically according to the triangular arrangement. Because there is a relation $D=\sqrt{3}\times\Lambda$ between the heterogeneous core-to-core distance $\Lambda$ and the homogeneous core-to-core distance D, the homogeneous core-to-core distance D can be calculated by multiplying the heterogeneous core-to-core distance $\Lambda$, obtained in S1, by $\sqrt{3}$.

Next, the coupling coefficient $|K_{12}|$ is obtained from the homogeneous core-to-core distance D calculated in S2. FIG. 9C is a graph showing the relation between the homogeneous core-to-core distance D and the homogeneous core-to-core coupling length $l_c$ for homogeneous cores with the relative refractive index difference $\Delta$. From this relation, the core-to-core homogeneous coupling length $l_c$ corresponding to the homogeneous core-to-core distance D is obtained. The coupling coefficient $|K_{12}|$ is calculated from the obtained coupling length $l_c$. The coupling coefficient $|K_{12}|$ can be calculated using the relation $l_c=\pi/2|K_{12}|$ shown in expression (7) (S3).

Expression (16) given above indicates that the difference in the propagation constants $(\beta^{(1)}-\beta^{(2)})$ changes with the perturbation amount $\delta n^2(x, y)$ as the parameter. Using this relation, the relation is obtained between the displacement from the reference position of the space position, in which the perturbation amount $\delta n^2(x, y)$ is present, and the deviation $(\beta^{(1)}-\beta^{(2)})$ generated in the propagation constants between the homogeneous cores. In FIG. 9D, the shift amount $\delta d$ represents the one-dimensional shift amount $\delta x$ in the x-axis direction of the perturbation amount $\delta n^2(x, y)$ (S4).

Expression (4) given above represents the relation among the power conversion efficiency F, the difference in the propagation constants $(\beta^{(1)}-\beta^{(2)})$, and the coupling coefficient $|K_{12}|$. Using this relation, the relation between the amount of shift $\delta d$ from the reference position and the power conversion efficiency (crosstalk) F is calculated based on the coupling coefficient $|K_{12}|$ obtained in S3, the displacement from the reference position obtained in S4, and the deviation $(\beta^{(1)}-\beta^{(2)})$ generated in the homogeneous core propagation constants (S5).

The amount of shift $\delta d$ necessary for satisfying the specified power conversion efficiency (crosstalk) $F_0$ is obtained from the relation between the amount of shift $\delta d$ from the reference position, obtained in S5, and the power conversion efficiency (crosstalk) F (S6).

The expression (18) given below is known as the relation between the V value (Normalized frequency (V parameter)) of an optical fiber and the normalized propagation constant b in the basic mode.

$$J_1((\sqrt{(1-b)})V)\cdot K_0((\sqrt{b})V)/(J_0((\sqrt{(1-b)})V)\cdot K_1((\sqrt{b}))V))=(b/(1-b))^{1/2} \quad (18)$$

where $J_0(x)$ and $J_1(x)$ are zero-order and first-order Bessel functions respectively, and $K_0(x)$ and $K_1(x)$ are zero-order and first-order modified Bessel functions of the second kind respectively.

The V value (Normalized frequency (V parameter)) and the normalized propagation constant b are represented by the following expressions.

$$V=k_0 a(n_1^2-n_2^2)^{1/2} \quad (19)$$

$$b=\{(\beta/k_0)^2-n_2^2\}/(n_1^2-n_2^2) \quad (20)$$

where $k_0$ ($=2\pi/\lambda$) is the propagation constant of a plane wave in the vacuum, $n_1$ is the refractive index of the core, and $n_2$ is the refractive index of the cladding.

Using the normalized propagation constant b obtained by solving expression (18), $\kappa$ and $\gamma$ are obtained using the expressions given below.

$$\kappa=\{n_1^2-(\beta/k_0)^2\}^{1/2} \quad (21)$$

$$\gamma=\{(\beta/k_0)^2-n_2^2\}^{1/2} \quad (22)$$

Using $\kappa$ and $\gamma$ obtained as described above, the electric field distributions $E_0(x, y)$ in the core and the cladding are expressed by the following expressions.

$$E_0(x, y) = A \cdot J_0(\kappa r) \quad (23)$$
$$= A \cdot (J_0(\kappa a)/K_0(\gamma a))K_0(\gamma r)$$

where r, the distance from the center of the core, is represented as follows.

$$r=(x^2+y^2)^{1/2} \quad (24)$$

Then, the perturbation can be calculated using expression (16).

FIG. 9D shows the relation between the power conversion efficiency F and the amount of shift δd that are related via the propagation constant difference ($\beta^{(1)}-\beta^{(2)}$). Based on specified power conversion efficiency (crosstalk) $F_0$, the minimum amount of shift δd, necessary to reduce the crosstalk to a level equal to or smaller than this crosstalk level, is obtained. This amount of shift δd (δx) is the amount of shift in position that allows heterogeneous cores or low refractive index regions to be arranged at positions shifted from the symmetrically arranged lattice point positions.

[2. Example of Perturbation Via Heterogeneous Core]

The following describes examples of a perturbation via heterogeneous cores using two types of configuration examples: a configuration example of a heterogeneous multicore fiber including high refractive index difference heterogeneous cores and a configuration example of a heterogeneous multicore fiber including low refractive index difference heterogeneous cores. In each configuration example, a triangular arrangement and a rectangular arrangement are described as a periodic arrangement having translational symmetry and rotational symmetry.

[2.1: Configuration Example of a Heterogeneous Multicore Fiber Including High Refractive Index Difference Heterogeneous Cores]

First, the following describes a configuration example of a heterogeneous multicore fiber including high refractive index difference heterogeneous cores.

[2.1.1 Example of Triangular Arrangement]

An example in which heterogeneous cores are arranged at lattice points, arranged in a triangular arrangement (closest packed arrangement), is described.

Figure 10:
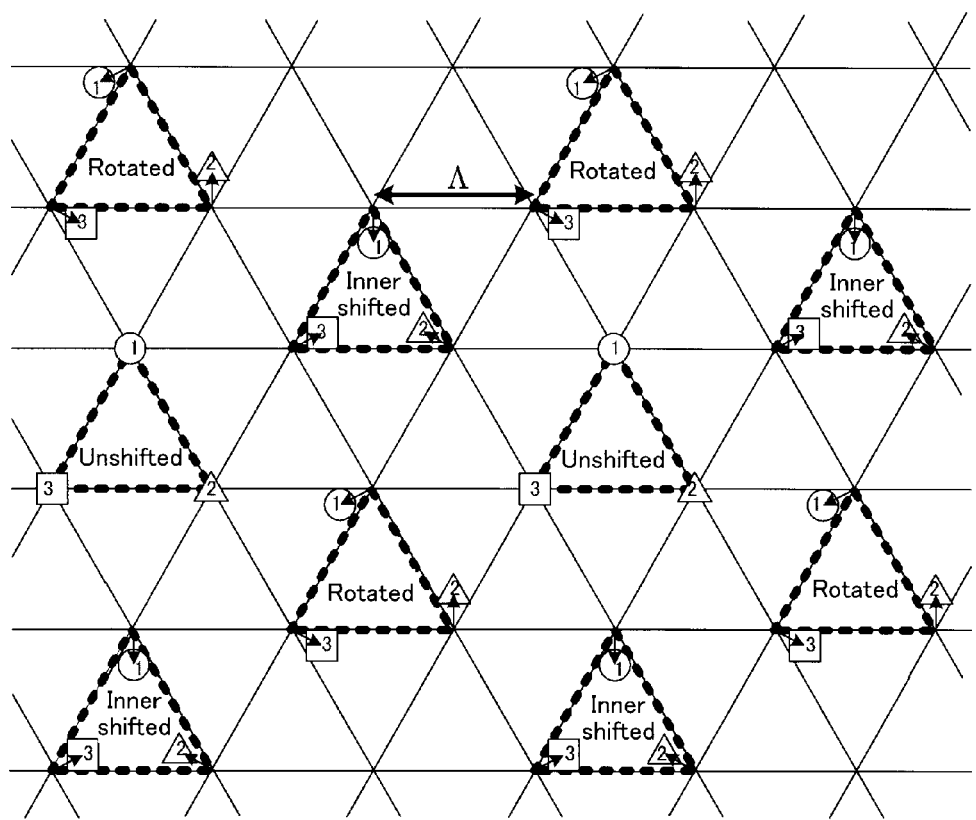
[FIG. 10]

FIG. 10 shows an example in which three types of heterogeneous cores are arranged at lattice points arranged in a triangular arrangement (closest packed arrangement). In this example, three heterogeneous cores form a core group where one of the relative refractive index difference of a core from the cladding, core diameter, and refractive index distribution in the core differs among these cores. These three heterogeneous cores of each core group are arranged at positions shifted from lattice points.

In FIG. 10, each core group is indicated by a broken-line triangle, and the three cores differ in the relative refractive index difference Δ. The three types of core, each with a different relative refractive index difference Δ, are represented by a circle, a triangle, and a rectangle as well as the symbols "1", "2", and "3" respectively.

In the example shown in the figure, the adjacent three types of cores form a core group, and a perturbation, which is generated by arranging the cores at positions shifted from periodic lattice points, is performed on a core group basis. FIG. 10 shows three modes of core groups: a core group (indicated by "Unshifted" in the figure) where cores are arranged at lattice point positions, a core group (indicated by "Rotated" in the figure) where the vectorial direction in which the cores are shifted from the lattice point positions is rotated, and a core group (indicated by "Inner shifted" in the figure) where the vectorial direction in which the cores are shifted from the lattice point positions is toward the inside or outside of a triangle.

According to this core shift, the change in the propagation constant of each of the cores i, j, and k in a core group, which is caused by a perturbation, is expressed by the expressions given below.

1. Unshifted Core Group

Core #i:

$$\beta^2 = \beta_0^2 + \frac{k_0^2 \cdot I_i}{\iint_\infty |E_0(x,y)|^2 dxdy} \quad (25)$$

where $$I_i = \iint_{Position\#1} \delta n_j^2(x,y)|E_0(x,y)|^2 dxdy + \\ 2\iint_{Position\#2} \delta n_j^2(x,y)|E_0(x,y)|^2 dxdy + \\ \iint_{Position\#1} \delta n_k^2(x,y)|E_0(x,y)|^2 dxdy + \\ 2\iint_{Position\#2} \delta n_k^2(x,y)|E_0(x,y)|^2 dxdy \quad (26)$$

In the above expressions, Position#1 indicates the position at which a core remains un-shifted (hereinafter indicated as Λ), Position#2 indicates the position to which the core is shifted by $(\sqrt{3}/2)\times\delta d$ (hereinafter indicated as $(\Lambda+(\sqrt{3})/2\times\delta d)$) in terms of the center-to-center distance, and $\delta n_j^2(x,y)$ is expressed as $$\delta n_j^2(x,y) = n_j^2 - n_2^2 \text{ (in neighboring core } j) \quad (27)$$
$$= 0 \text{ (out of neighboring core } j)$$

where $n_j$ is the refractive index of the heterogeneous core.

i, j, and k are a combination of (1, 2, 3) and δd>0 indicates the direction in which the distance is increased.

The integration of expression (25) and expression (26) is represented simply as a combination of the neighboring cores and its integration area as follows using the symbol x.

Core#i:(Core#j+Core#k)×[Λ+2(Λ+(√3)/2×δd)]     (28)

The expression (28) given above indicates a core group (Unshifted core group) where the cores are arranged at lattice point positions.

2. Inner Shifted Core Group

As in the case of an unshifted core group, the expression given below indicates a core group (Inner shifted core group) where the cores are arranged at the positions determined by vectorially transferring the cores from the lattice point positions in the direction of the inside or outside of a triangle.

Core#i:

(Core#j+Core#k)×[{Λ−(√3)/2×δd}+{Λ+(√3)/2×δd}+{Λ−√3×δd}]     (29)

3. Rotated Core Group

As in the case of an unshifted core group, the expression given below indicates a core group (Rotated core group) where the cores are arranged at the positions determined by vectorially rotating the cores from the lattice point positions.

Core # i:

Core#j×[2{Λ−(√3)/2×δd}+{Λ+(√3)/2×δd}]+Core#k×[Λ+2{Λ−(√3)/2×δd}+{Λ+(√3)/2×δd}]     (30)

In the above expressions, cores i, j, and k represent the three types of cores with different relative refractive index differences Δ.

The position where a perturbation part is present determines the positions of cores as follows. For example, for the six lattice points most adjacent to a lattice point at which core i of an unshifted core group is placed, one of the three cores j is placed at a distance of Λ in terms of the straight-line distance between core i and core j, that is, the core is not shifted, and each of the two of the three cores j is placed at a distance determined by shifting Λ by (√3)/2×δd in terms of the straight-line distance between core i and core j; similarly, one of the three cores k is placed at a distance of Λ in terms of the straight-line distance between core i and core j, that is, the core is not shifted, and each of the two of the three cores k is placed at a distance determined by shifting Λ by (√3)/2×δd in terms of the straight-line distance between core i and core j.

Figure 11:
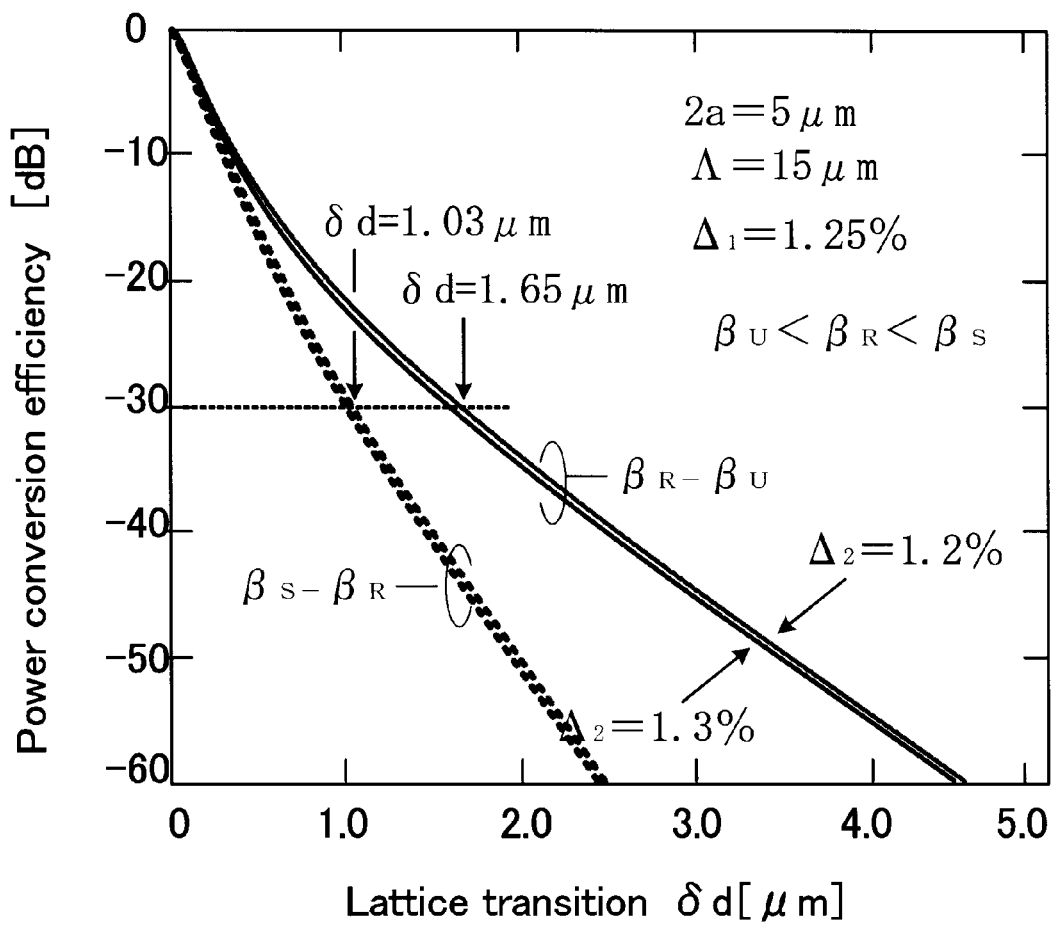
[FIG. 11]

FIG. 11 is obtained by calculating the propagation constants $\beta U$, $\beta S$, and $\beta R$ for the core groups, which include the unshifted core group, inner shifted core group, and rotated core group, from expression (16) based on the vector shifts described above, where the vertical axis indicates the power conversion efficiency F (dB) and the horizontal axis indicates the shift amount δd(μm). FIG. 11 is a diagram showing the relation between the power conversion efficiency and the shift amount δd of the core positions.

Because there is a relation $\beta U<\beta R<\beta S$ among the propagation constants $\beta U$, $\beta S$, and $\beta R$ and the effect of $\beta R-\beta U$ is small, a large amount of shift is required. To satisfy this need, the shift amount δd corresponding to the specified power conversion efficiency $F_0$ is obtained based on the $\beta R-\beta U$ curve in FIG. 11 and a perturbation is generated according to this shift amount.

For example, when −30 dB is specified as the power conversion efficiency $F_0$, the $\beta R-\beta U$ curve in FIG. 11 gives the shift amount of δd=1.65 μm.

Figure 12A:
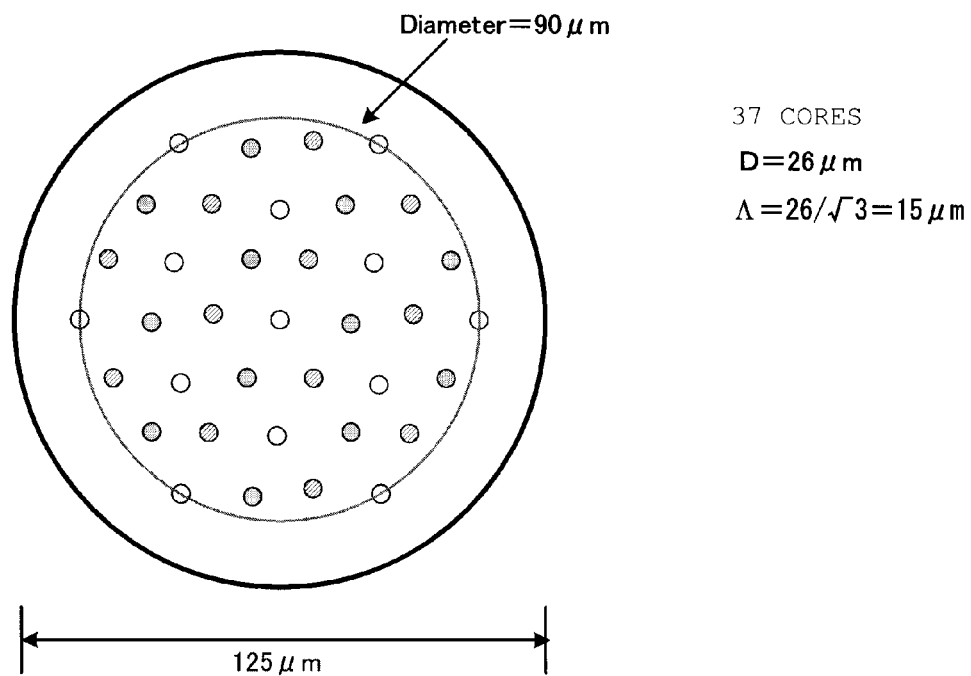
FIG. 12A-B is a diagram showing an example in which three types of high refractive index difference heterogeneous cores are arranged at the lattice points in a triangular arrangement.
Figure 12B:
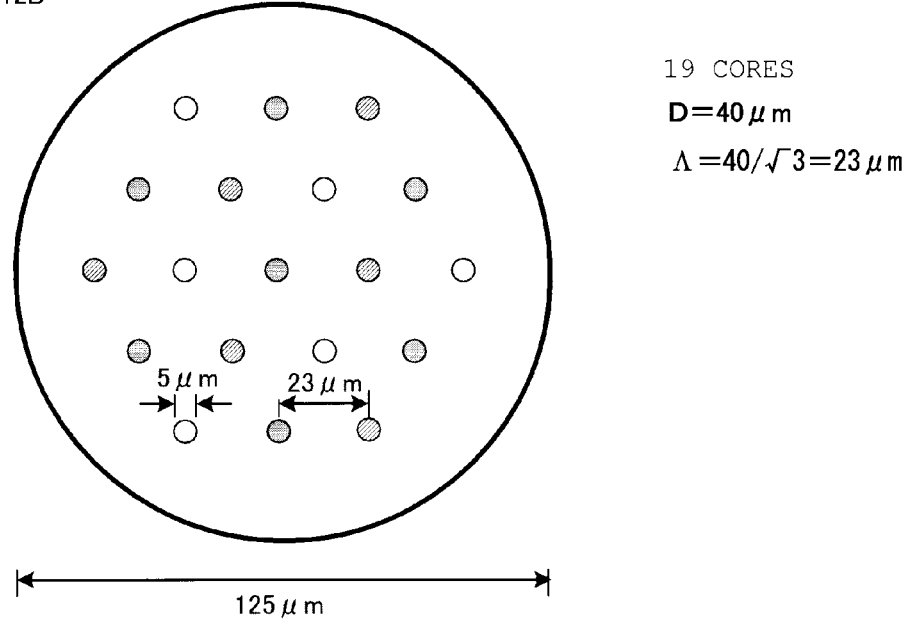

FIG. 12 shows an example in which three types of heterogeneous cores are arranged at the lattice points in a triangular arrangement in an optical fiber with the diameter of 125 μm. FIG. 12A shows a configuration example of the present invention, and FIG. 12B shows an example of the conventional configuration.

The configuration example shown in FIG. 12A is the configuration of the present invention in which the homogeneous core-to-core distance D is 26 μm, the heterogeneous core-to-core distance Λ is 15 μm, and the shift amount δd is 1.65 μm. In this configuration, the total number of cores is 37.

On the other hand, the configuration example shown in FIG. 12B is the conventional configuration in which the homogeneous core-to-core distance D is 40 μm and heterogeneous core-to-core distance Λ is 23 μm. In this configuration, the total number of cores is 19.

Therefore, the configuration of the present invention can accommodate twice as many cores.

Because a lattice point in the outermost periphery of an optical fiber receives fewer perturbations (3 or 4) than an inner lattice point, the perturbation to the propagation constant is smaller than that to the propagation constant of a core arranged at an inner lattice point. Therefore, because the propagation constant becomes smaller and, in addition, the corresponding homogeneous core with which coupling is to be suppressed is in an inner side of the optical fiber than the lattice, the coupling suppression effect is increased.

Figure 13:
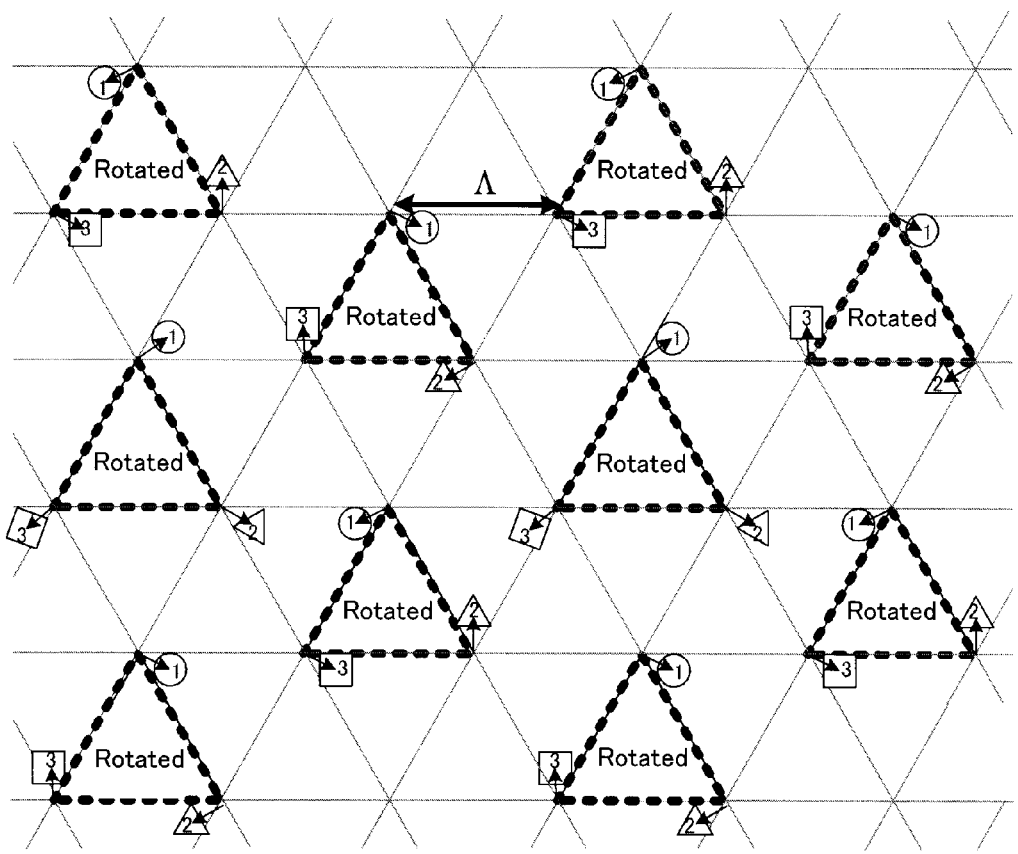
[FIG. 13]
Figure 14:
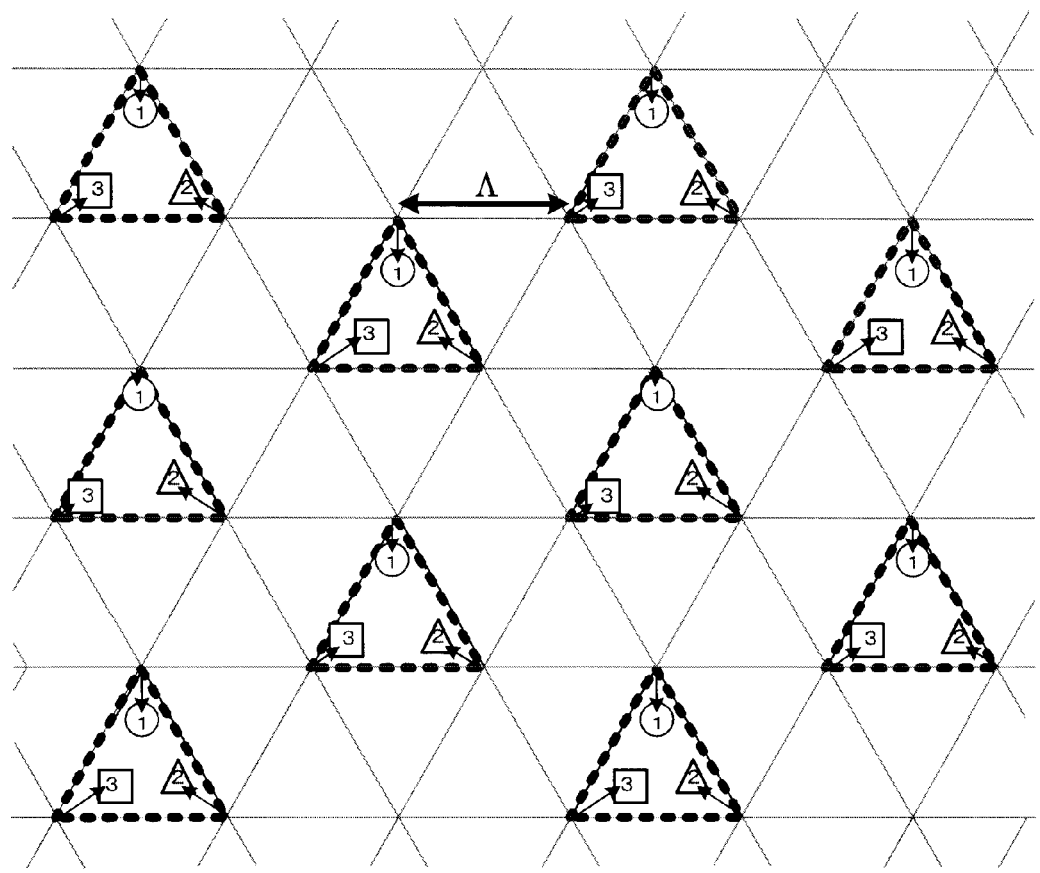
[FIG. 14]

As in the example shown in FIG. 10, three types of heterogeneous cores are arranged at the lattice points in a triangular arrangement (closest packed arrangement) in the examples in FIG. 13 and FIG. 14.

In the configuration example shown in FIG. 13, three heterogeneous cores form a core group where one of the relative refractive index difference of a core from the cladding, core diameter, and refractive index distribution in the core differs among these cores. These three heterogeneous cores of each core group are rotated and arranged at positions shifted from lattice points. In the example shown in the figure, a core group is formed by three adjacent cores and, for all core groups, the vector direction in which to shift the cores from lattice point positions is rotated. In the shift via this rotation, an adjustment is made by changing the rotational angle or the rotational direction so that a perturbation of the same displacement is not generated for the homogeneous cores.

In the configuration example shown in FIG. 14, three heterogeneous cores form a core group where one of the relative refractive index difference of a core from the cladding, core diameter, and refractive index distribution in the core differs among these cores. In each of the core groups, the cores are arranged at positions shifted from the lattice points by shifting the cores in the direction of the central lattice point. In the example shown in the figure, a core group is formed by three adjacent cores and, for all core groups, the shift amount for which the cores are shifted from the lattice point positions to the central lattice point is changed. An adjustment is made by changing the shift amount in this way so that a perturbation of the same displacement is not generated for the homogeneous cores.

[2.1.2: Example of Rectangular Arrangement]

Next, an example in which heterogeneous cores are arranged at lattice points, arranged in a rectangular arrangement, is described.

Figure 15:
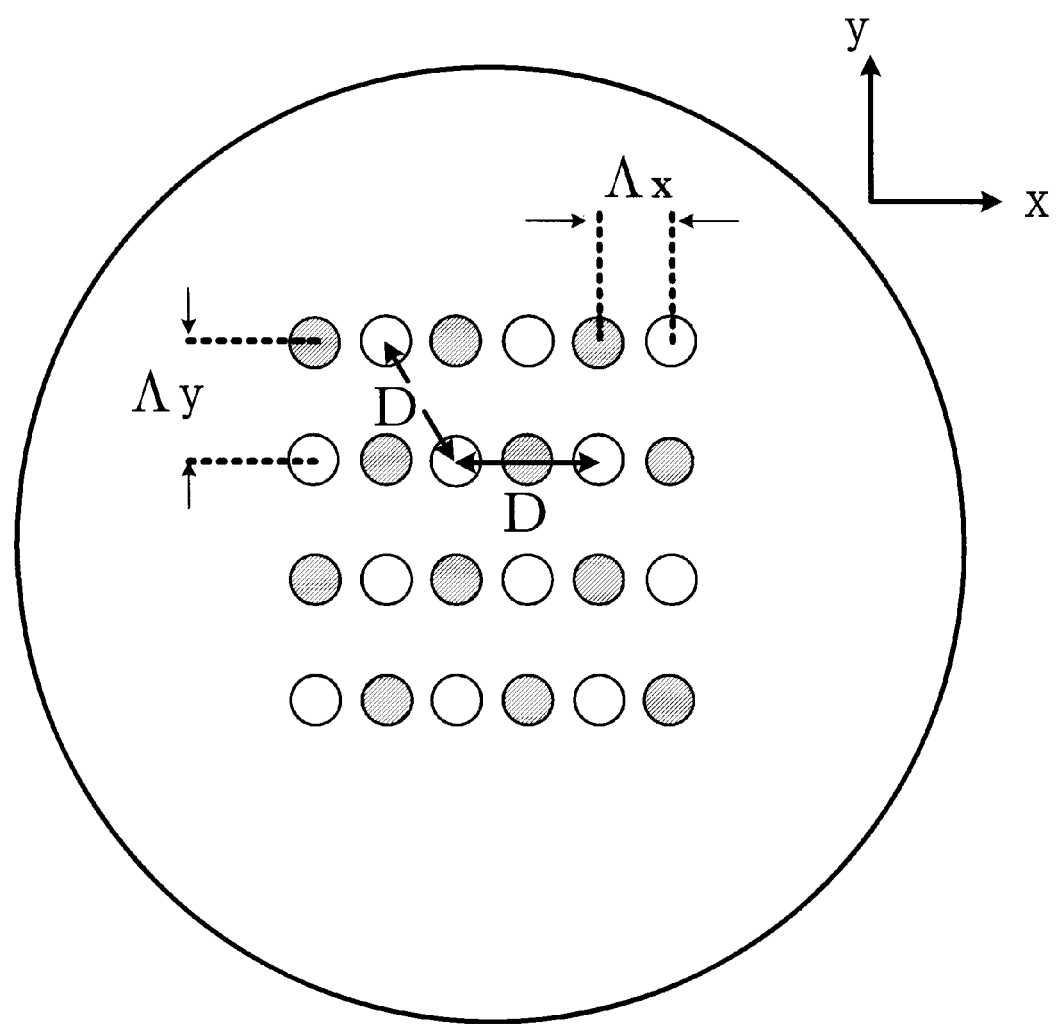
[FIG. 15]

FIG. 15 shows an example in which two types of heterogeneous cores are arranged at lattice points arranged in a rectangular arrangement. When arranged at the lattice points of the rectangular arrangement, the two types of heterogeneous cores are arranged in such a way that the homogeneous core-to-core distance is D and that, by shifting the cores in the x-axis direction and the y-axis direction, the heterogeneous core-to-core distance in the x-axis direction is Λx and the heterogeneous core-to-core distance in the y-axis direction is Λy.

Figure 16:
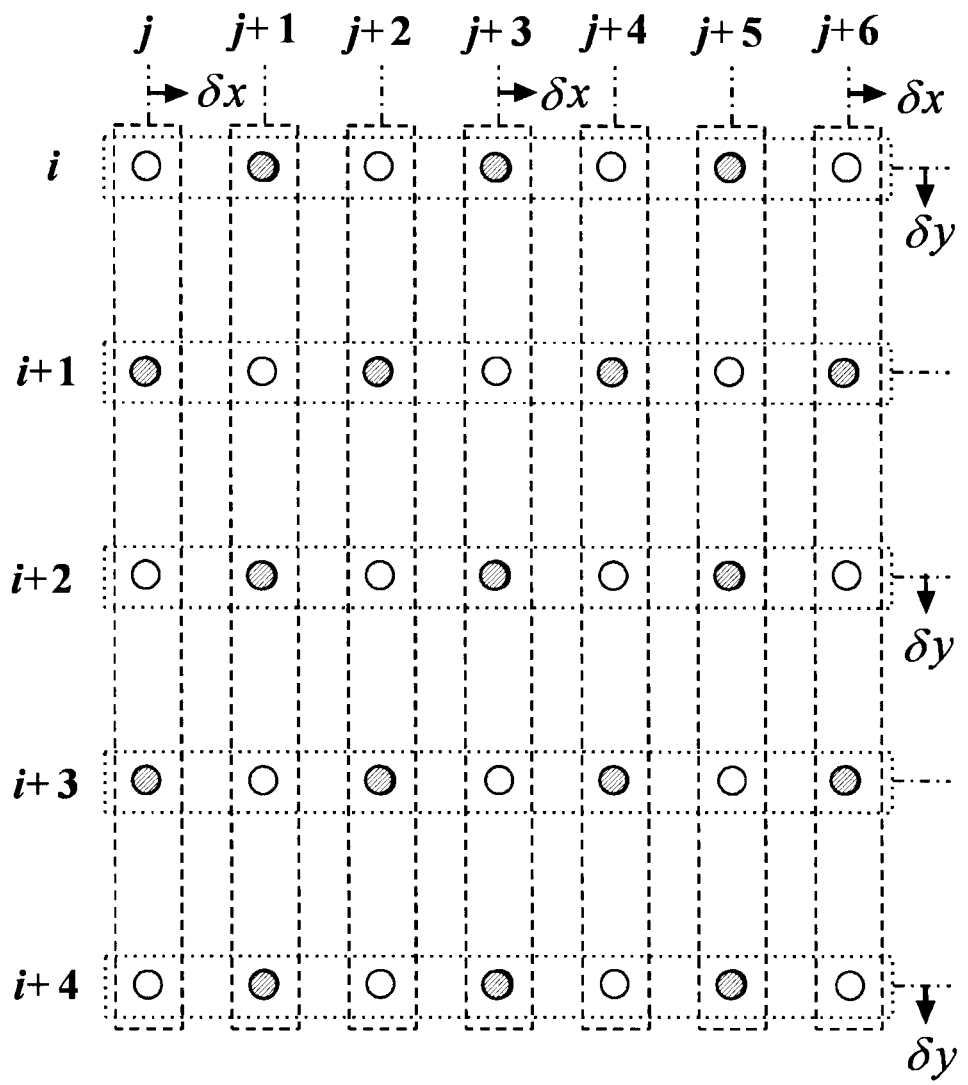
[FIG. 16]

An example of the mode, in which the heterogeneous cores in a rectangular arrangement are shifted, is described with reference to FIG. 16. In the mode of the shift shown in FIG. 16, the heterogeneous cores are shifted δx every third row in the x-axis direction (horizontal direction in the figure) and shifted by every second row in the y-axis direction (vertical direction in the figure).

Shifting the heterogeneous cores every third row in the x-axis direction (horizontal direction in the figure) prevents the same amount of perturbation from being generated as in FIG. 7C. Shifting the heterogeneous cores in this way makes different the amount of perturbations to the four adjacent homogeneous cores.

[2.2: Configuration Example of a Heterogeneous Multicore Fiber Including Low-Index-Contrast Heterogeneous Cores]

The heterogeneous multicore fiber described in 2.1 is a high-index-contrast fiber with the relative refractive index difference Δ of about 1.2%.

Next, a low index contrast with the relative refractive index difference Δ of about 0.3%-0.4% is described. The relative refractive index difference Δ of a currently used single mode core fiber is about 0.3%-0.4%. Therefore, a low-index-contrast multicore fiber with the relative refractive index difference of about 0.3%-0.4% de scribed below, which is applicable to a currently used single mode core fiber without change, has a wide range of application.

[2.2.1: Example of Triangular Arrangement]

A multicore fiber may be designed for a low relative refractive index difference multicore fiber as for a high relative refractive index difference multicore fiber. The following describes how seven cores are accommodated in an optical fiber with the diameter of 125 μm in the conventional configuration.

FIG. 17 is a diagram showing crosstalk between heterogeneous cores when low relative refractive index difference cores are arranged in a triangular arrangement (closest packed arrangement). FIG. 17A shows that the state in which the low relative refractive index difference homogeneous core-to-core distance is D, FIG. 17B shows the state in which the heterogeneous core-to-core distance is $\Lambda$, FIG. 17C shows the relation between the coupling length $l_c$ and the homogeneous core-to-core distance D, and FIG. 17D shows the curves with the relative refractive index differences $\Delta_1$ and $\Delta_2$ and the distance $\Lambda$ as the parameters where the vertical axis indicates the power conversion efficiency F and the horizontal axis indicates the relative refractive index difference $\Delta_2$.

In the figures, the relative refractive index differences $\Delta_1$ are 0.325%, 0.350%, and 0.375%.

When the design requirements for a multicore fiber in the conventional configuration is that the crosstalk is −30 dB or lower for the propagation constant of 100 km, the coupling length $l_c$ between homogeneous cores is 5000 km. To satisfy this coupling length $l_c$, the relation shown in FIG. 17C indicates that the homogeneous core-to-core distance D must be 70 μm ("D" in FIG. 17C).

In the conventional configuration, when the homogeneous core-to-core distance D is 70 μm, the heterogeneous core-to-core distance is 40μm ($=70/\sqrt{3}$). When the heterogeneous core-to-core distance is 40μm, FIG. 17D indicates that crosstalk between heterogeneous cores is −80 dB or lower, meaning that the distance satisfies the design requirements of −30 dB or lower more than enough.

Figure 17A:
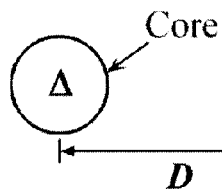
FIG. 17A-D is a diagram showing the coupling length between homogeneous cores and crosstalk between heterogeneous cores when low relative refractive index difference cores are arranged in a triangular arrangement (closest packed arrangement).
Figure 17B:
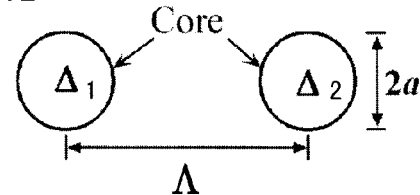
Figure 17C:
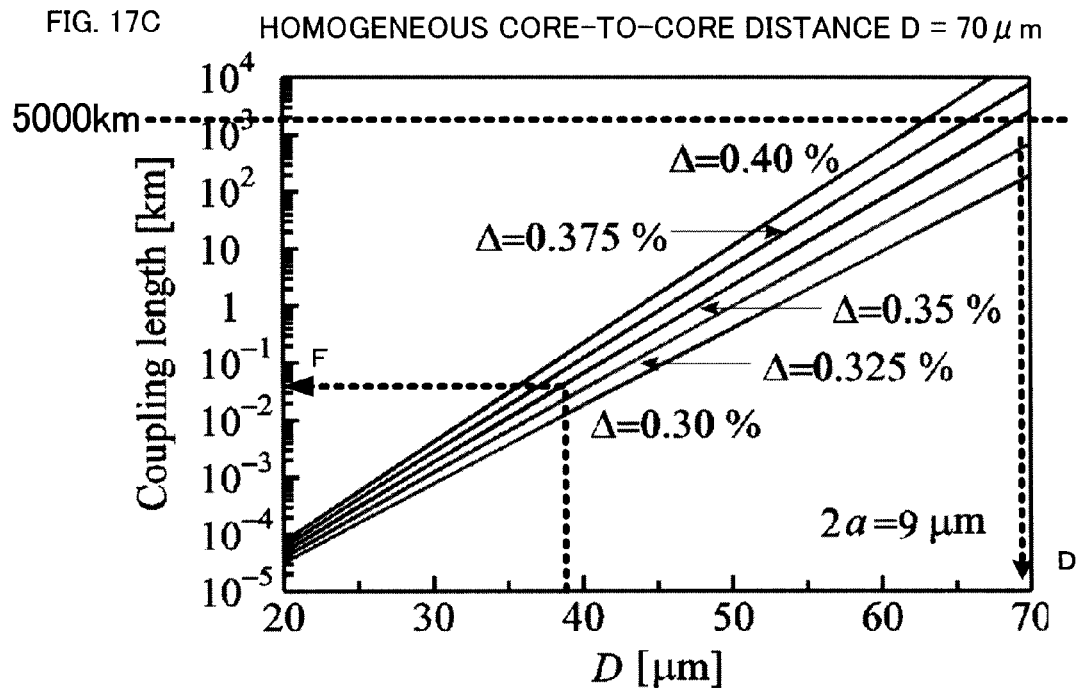
Figure 17D:
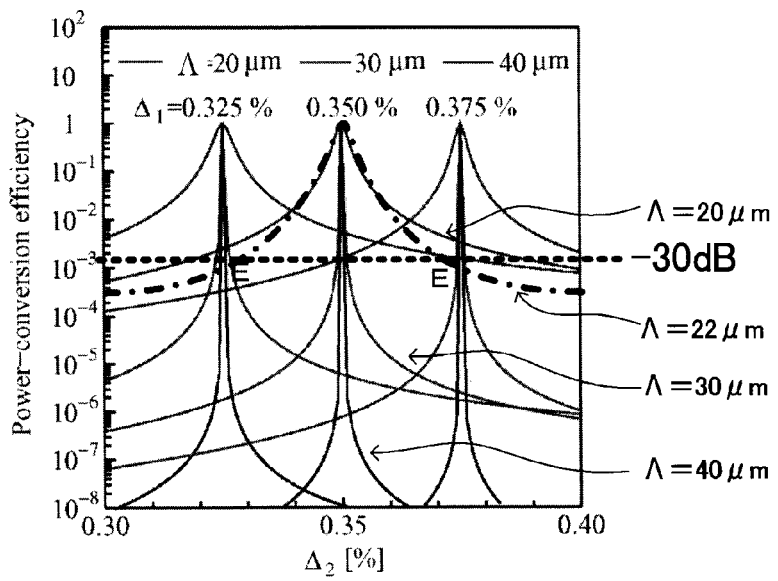

In the configuration of the present invention, when the design requirements are that crosstalk between heterogeneous cores is −30 dB or lower, the heterogeneous core-to-core distance $\Lambda$ is obtained from the relation in FIG. 17D and $\Lambda = 22$ μm is obtained ("E" in FIG. 17D). Note that the 0.350% is set as the relative refractive index difference $\Delta_1$ and that the 0.325% or 0.375% is set as the relative refractive index difference $\Delta_2$.

When the heterogeneous core-to-core distance $\Lambda$ is 22 μm, the configuration of a triangular arrangement implies that the homogeneous core-to-core distance D is 38.1 μm ($=\sqrt{3} \times 22$). The relation in FIG. 17C indicates that the coupling length $l_c$ corresponding to this homogeneous core-to-core distance D is 50 m ("F" in FIG. 17C).

The coupling coefficient $|K_{12}|$ is calculated from the obtained coupling length $l_c$. The calculation of the coupling coefficient $|K_{12}|$, which may be carried out using the relation $l_c = \pi/2|K_{12}|$ shown in expression (7), produces the result $|K_{12}| = 3.14 \times 10^{-2}$ rad/m.

To satisfy the condition $F<F_0$, which indicates that the power conversion efficiency F is smaller than a predetermined crosstalk $F_0$, the following expression, which is once given above, must be satisfied as in the design example of a high relative refractive index difference multicore fiber.

$$\beta^{(1)} - \beta^{(2)} \geq ((1-F_0)/F_0)^{1/2} \times (2|K_{12}|) \quad (9)$$

For example, when the crosstalk $F_0$ is $10^{-3}$ (−30 dB), the following must be satisfied.

$$\beta^{(1)} - \beta^{(2)} \geq (999)^{1/2} \times (2|K_{12}|) \quad (10)$$

When the value of $|K_{12}| = 3.14 \times 10^{-2}$ rad/m, obtained in the design of a low relative refractive index difference multicore fiber, is applied, the condition for satisfying $F<F_0$ is as follows.

$$\beta^{(1)} - \beta^{(2)} \geq 1.986 \, \text{rad/m} \quad (31)$$

The value of the propagation constant $\beta$ is as follows as in the example of the design of a high relative refractive index difference multicore fiber.

$$\beta^{(1)} = (2\pi/\lambda) \times n_{eq} \approx 5.88 \times 10^6 \, \text{rad/m} \quad (15)$$

Therefore, the crosstalk of the design value may be satisfied by giving a perturbation of about $3.4 \times 10^{-7}$ ($= 1.986/5.88 \times 10^6$) according to the ratio between the propagation constants.

Next, the following describes an example of core position shifting with reference to FIG. 18.

Figure 18A:
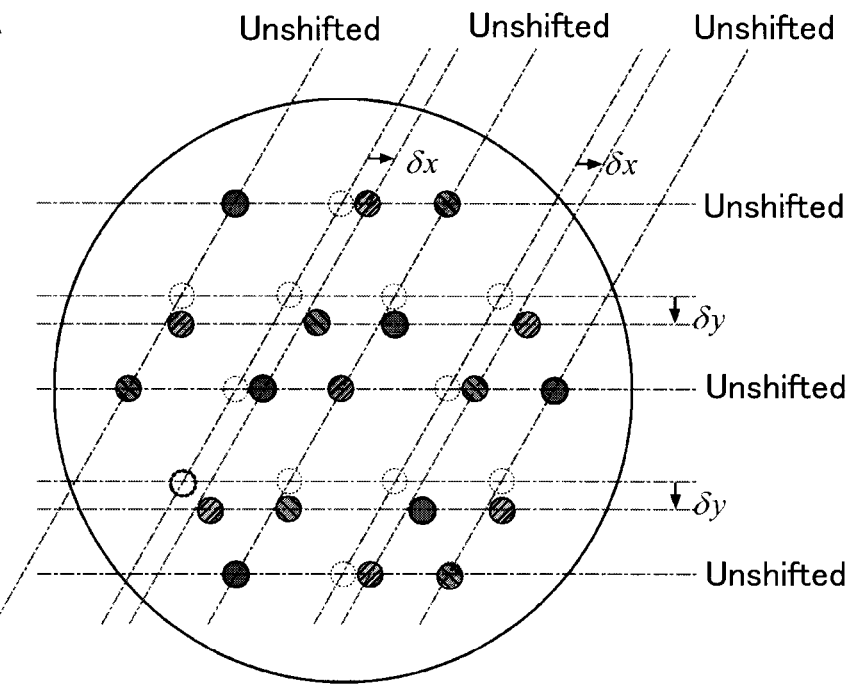
FIG. 18A-B is a diagram showing an example of core position shifting.

FIG. 18A is a diagram showing an example of core arrangement shifting from the lattice points in a triangular arrangement. In this example, the core groups are formed in the x-axis direction and in the diagonal direction and, in each direction, the position of each of the core groups is shifted in the y direction and the x direction. That is, the core groups in the x-axis direction are shifted by in the y direction, all core groups at a time, and the core groups in the diagonal direction are shifted δx in the x direction, all core groups at a time. This shifting generates a perturbation.

This mode of core shifting, in which the cores are arranged on a straight line in the x direction, has an advantage in that the optical fiber can be connected easily to a waveguide-type fan-out device (waveguide type output terminal).

Figure 18B:
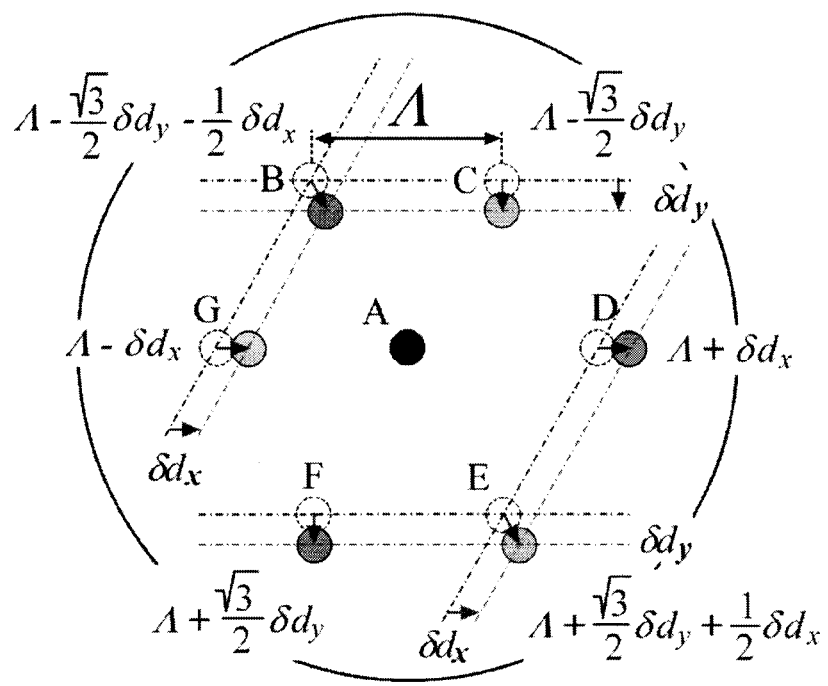

FIG. 18B shows an example in which the mode of core position shifting in the x-axis direction and in the y-axis direction is applied to a low relative refractive index difference seven-core fiber. The seven cores are composed of one central core A and the surrounding cores B-G. The figure shows an example of perturbation in which the six surrounding cores, B -G, are shifted.

In FIG. 18B, the six shift amounts, represented by ($\Lambda \pm \delta$), indicate change amounts by which the distance to the central core A is changed by shifting the six surrounding cores B-G from the lattice point positions (broken line positions in the figure). In the figure, a position indicated by the broken line indicates a lattice point position, a position indicated by the solid line indicates the position to which the core is shifted, and an arrow indicates the shift direction.

The shift amount of surrounding core B is ($\Lambda - (\sqrt{3}/2) \cdot \delta dy - (1/2) \cdot \delta dx$), the shift amount of surrounding core C is ($\Lambda - (\sqrt{3}/2) \cdot \delta dy$), the shift amount of surrounding core D is ($\Lambda + \delta dx$), the shift amount of surrounding core E is ($\Lambda + (\sqrt{3}/2) \cdot \delta dy + (1/2) \cdot \delta dx$), the shift amount of surrounding core F is ($\Lambda + (\sqrt{3}/2) \cdot \delta y$), and the shift amount of surrounding core G is ($\Lambda - \delta dx$). $\Lambda$ represents the distance between the neighboring cores of surrounding cores, and δdx and δdy represent the shift amounts in the x-axis direction and the y-axis direction of the core group, composed of the surrounding cores, respectively.

When perturbed, a surrounding core receives a perturbation from the central core and a perturbation from other surrounding cores. Therefore, though a change in distance caused by a perturbation from a neighboring core arranged in x direction is δdx, there is a need to include a change in the core to core distance for a neighboring core shifted in the y direction.

The amount of shift from each lattice point due to a perturbation is described below. In the description, δd>0 indicates the direction in which the distance is increased, and core #1 indicates the central core A, core #2 indicates surrounding cores B, D, and F, and core #3 indicates surrounding cores C, E, and G, respectively.

1. Central core A $$(\text{Core \#2}) \times \left[\{\Lambda - (1/2) \times \delta dx - (\sqrt{3}/2) \times \delta dy\} + (\Lambda + \delta dx) + \{\Lambda + (\sqrt{3}/2) \times \delta dy\}\right] + \\ (\text{Core \#3}) \times \left[\{\Lambda + (1/2) \times \delta dx + (\sqrt{3}/2) \times \delta dy\} + (\Lambda - \delta dx) + \{\Lambda - (\sqrt{3}/2) \times \delta dy\}\right] \quad (32)$$

2. Surrounding core B $$(\text{Core \#1}) \times \{\Lambda - (1/2) \times \delta dx - (\sqrt{3}/2) \times \delta dy\} + \\ (\text{Core \#3}) \times [(\Lambda - \delta dx) + \{\Lambda - (\sqrt{3}/2) \times \delta dy\}] \quad (33)$$

3. Surrounding core C $$(\text{Core \#1}) \times \{\Lambda - (\sqrt{3}/2) \times \delta dy\} + \\ (\text{Core \#2}) \times [(\Lambda - \delta dx) + \{\Lambda + (1/2) \times \delta dx - (\sqrt{3}/2) \times \delta dy\}] \quad (34)$$

4. Surrounding core D $$(\text{Core \#1}) \times (\Lambda + \delta dx) + (\text{Core \#3}) \times [\{\Lambda - (\sqrt{3}/2) \times \delta dy\} + \\ \{\Lambda + (1/2) \times \delta dx - (\sqrt{3}/2) \times \delta dy\}] \quad (35)$$

5. Surrounding core E $$(\text{Core \#1}) \times \{\Lambda + (1/2) \times \delta dx + (\sqrt{3}/2) \times \delta dy\} + \\ (\text{Core \#2}) \times [\{\Lambda + \times \delta dx\} + \{\Lambda + (\sqrt{3}/2) \times \delta dy\}] \quad (36)$$

6. Surrounding core F $$(\text{Core \#1}) \times \{\Lambda + (\sqrt{3}/2) \times \delta dy\} + \\ (\text{Core \#3}) \times [\{\Lambda + \times \delta dx\} + \{\Lambda - (1/2) \times \delta dx + \{(\sqrt{3}/2) \times \delta dy\}] \quad (37)$$

7. Surrounding core G $$(\text{Core \#1}) \times (\Lambda - \delta dx) + (\text{Core \#2}) \times [\{\Lambda - (\sqrt{3}/2) \times \delta dy\} + \\ \{\Lambda - (1/2) \times \delta dx + \{(\sqrt{3}/2) \times \delta dy\}] \quad (38)$$

Consideration is now given to a combination that decreases the difference in perturbations. In FIG. 18B, note that the core movement directions are approximately line symmetrical with respect to the line (not shown) that is formed by joining surrounding core B, central core A, and surrounding core E. With this in mind, to adjust the shift amount δx in the x-axis direction and the shift amount δy in the y-axis direction, the ratio between the shift amount δx and the shift amount δy is adjusted so that the difference in the propagation constants between line-symmetrically placed surrounding core C and surrounding core G and the difference in the propagation constants between the line-symmetrically placed surrounding core D and surrounding core F are increased. For this adjustment, when comparing the surrounding core propagation constant differences, a comparison is made between surrounding core C and surrounding core G and between surrounding core D and surrounding core F.

Figure 19:
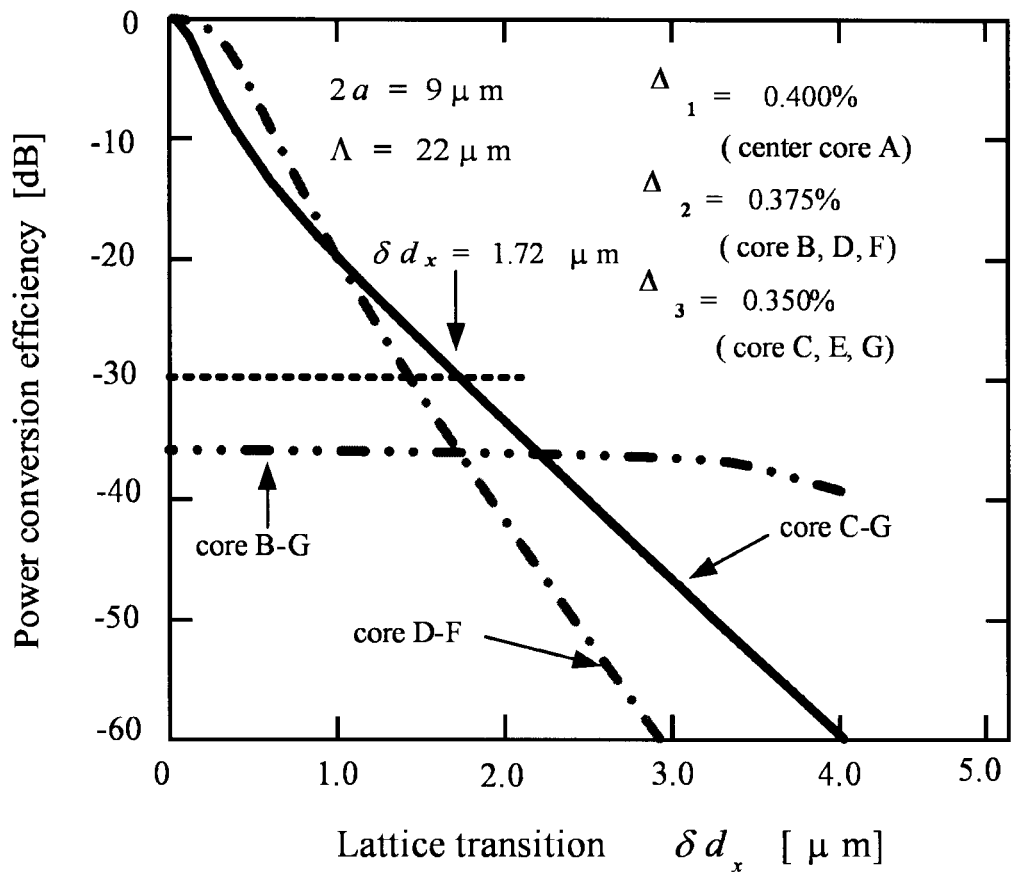
[FIG. 19]

FIG. 19 shows the calculation result of the power conversion efficiency for the shift amount δdx when the present invention is applied to a seven-core multicore fiber. The figure shows the relation among the power conversion efficiency between surrounding core C and surrounding core G, the power conversion efficiency between surrounding core D and surrounding core F, and the power conversion efficiency between surrounding core B and surrounding core G. The coupling between surrounding core C and surrounding core G and the coupling between surrounding core D and surrounding core F are a homogeneous core to core coupling, while the coupling between surrounding core B and surrounding core G is a heterogeneous core to core coupling.

In FIG. 19, the power conversion efficiency between surrounding core C and surrounding core G is indicated by the solid line, the power conversion efficiency between surrounding core D and surrounding core F is indicated by the dashed line, and the power conversion efficiency between surrounding core B and surrounding core G is indicated by the chain double dashed line. The broken line indicates the power conversion efficiency of −30 dB.

Because surrounding core C and surrounding core G are shifted closer to each other by a perturbation and surrounding core D and surrounding core F are shifted apart from each other by a perturbation, the perturbation between surrounding core C and surrounding core G is expected to be smaller than the perturbation between the surrounding core D and surrounding core F. The comparison between the surrounding core C-G curve and the surrounding core D-F curved line in FIG. 19 indicates that, at the power conversion efficiency level of −20 dB or lower, the surrounding cores C-G require a shift amount δx larger than that of the surrounding cores D-F, meaning that the perturbation between the surrounding core C and surrounding core G is small. To reserve a predetermined amount of perturbation difference even between surrounding core C and the surrounding core G where the perturbation difference is small, the shift amount in the y direction is set larger than the shift amount in the x direction with the relation being δdy=(5/(√3))δdx.

The figure indicates that the shift amount δx in the x direction for the surrounding cores C-G is 1.72 μm to decrease the power conversion efficiency to −30 dB or lower. The shift amount δy in the y direction is calculated as (5/√3)δx (=2.88δx)=4.95 μm.

The figure also indicates that the surrounding core B-G coupling, which is heterogeneous core coupling, decreases the core-to-core distance but that the power conversion efficiency is −35 dB or lower.

A surrounding core receives perturbations from the three neighboring surrounding cores, while the central core A receives perturbations from the six surrounding cores (surrounding core B-surrounding core F). Therefore, the power conversion efficiency with the surrounding cores is −35 dB or lower even when the shift amount is zero.

When the neighboring core-to-core distance is 22 μm, the propagation constant difference between surrounding core B and surrounding core G is reduced and, therefore, the power conversion efficiency becomes almost constant, about −35 dB, with no dependence on the core shift amount. On the other hand, when the neighboring core-to-core distance is 27 μm, the power conversion efficiency between surrounding core B and surrounding core G and between central core A and surrounding core G is −50 dB or lower. This can suppress core-to-core power coupling that may be generated because of a fluctuation in the core diameter or in the core-to-core distance in the longitudinal direction of the fiber.

Figure 20A:
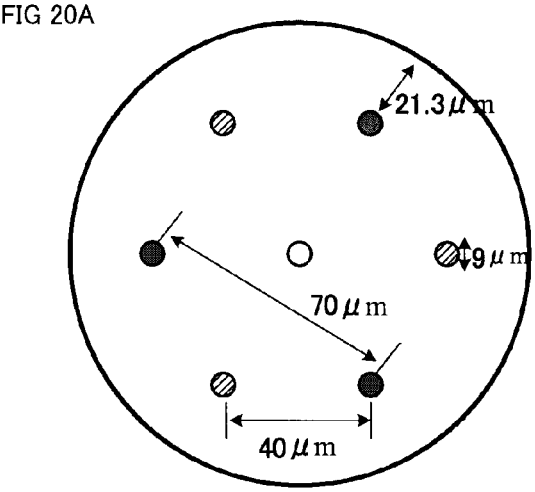
FIG. 20A-C is a diagram showing an example in which three types of low refractive index difference heterogeneous cores are arranged at lattice points arranged in a triangular arrangement.
Figure 20B:
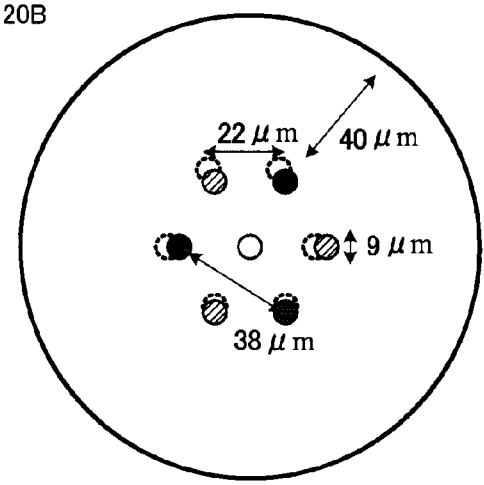
Figure 20C:
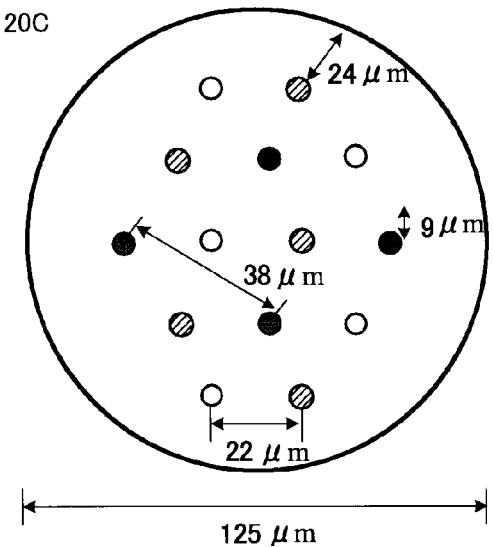

FIG. 20 shows an example in which three types of heterogeneous cores are arranged at lattice points arranged in a triangular arrangement in an optical fiber with the diameter of 125 μm. FIG. 20A shows an example of the conventional configuration, and FIGS. 20B and 20C show the configuration examples of the present invention.

In the example of the conventional configuration shown in FIG. 20A, the core diameter is 9 μm, the homogeneous core-to-core distance D is 70 μm, and the heterogeneous core-to-core distance is 40 μm (=70/√3). The number of accommodated cores is seven.

On the other hand, in the example of the configuration of the present application shown in FIG. 20B, the number of cores is seven. Perturbations are generated in this configuration in which the core diameter is 9μm, the shift amount δx in the x-axis direction is 1.72 μm, and the shift amount δy in the y-axis direction is 4.95 μm. Therefore, the heterogeneous core-to-core distance before perturbations can be reduced to 22 µm, and the homogeneous core-to-core distance D to 38 µm (=22 ×√3).

When cores, each 9 µm in core diameter, are arranged in a fiber with the diameter of 125 µm in the conventional configuration, the distance from a peripheral core to the fiber periphery is as small as 21.3 µm. Therefore, the conventional configuration has the problem that the peripheral core loss is increased.

On the other hand, even when cores, each 9 µm in diameter, are arranged in a fiber with the diameter of 125 µm in the configuration of the present invention as in the conventional configuration, the distance from a peripheral core to the fiber periphery is as large as 40 µm. Therefore, this configuration can reduce the peripheral core loss.

In addition, the number of cores may be increased to 14 in the configuration example shown in FIG. 20C. In this configuration example, the core diameter is 9 µm and perturbations may be generated, with the shift amount δx in the x-axis direction being 1.72 µm and the shift amount δy in the y-axis direction being 4.95 µm, wherein the heterogeneous core-to-core distance before the perturbation is 22 µm and the homogeneous core-to-core distance D is 38.1 µm (=22 ×√3). In this configuration, 14 cores may be accommodated in a fiber with the diameter of 125 µm.

This configuration allows 14 cores to be accommodated in an area with the radius of 38.1 µm and, at the same time, the distance between an outermost peripheral core and the fiber periphery to be reduced to 24 µm. Therefore, this configuration increases the distance between an outermost peripheral core and the fiber periphery as compared with that (22.5 µm) in the conventional configuration, thus decreasing the peripheral core loss.

Because the distance between neighboring cores, 38 µm-40 µm, is large and the distance between a peripheral core and the fiber periphery is small for small refractive index difference heterogeneous cores, the absorption loss caused by the covering on the outside of the cladding is increased. Therefore, the problem with the conventional configuration is that the fiber diameter must be 125 µm or larger. To solve this problem, the configuration of the present invention, in which perturbations are used, can reduce the distance between neighboring cores to as small as 22 µm and increase the distance between a peripheral core and the fiber periphery, thus suppressing an increase in the peripheral core loss.

FIG. 21 compares an example of the configuration of the present invention and an example of the conventional configuration for each of high-index-contrast cores and low-index-contrast cores arranged in a triangular arrangement.

[3. Example of Perturbation Caused by Low Refractive Index Region]

Next, the following describes a mode in which a second mode of perturbation of the present invention is caused. The second mode of perturbation is caused by providing low refractive index regions, such as air holes, at positions shifted from the lattice points arranged periodically and symmetrically.

The second mode of perturbation, a mode in which a perturbation is caused by providing low refractive index regions at perturbation parts, can be configured by replacing the parts, corresponding to the heterogeneous cores in the first mode of perturbation described above, by low refractive index regions.

Figure 22:
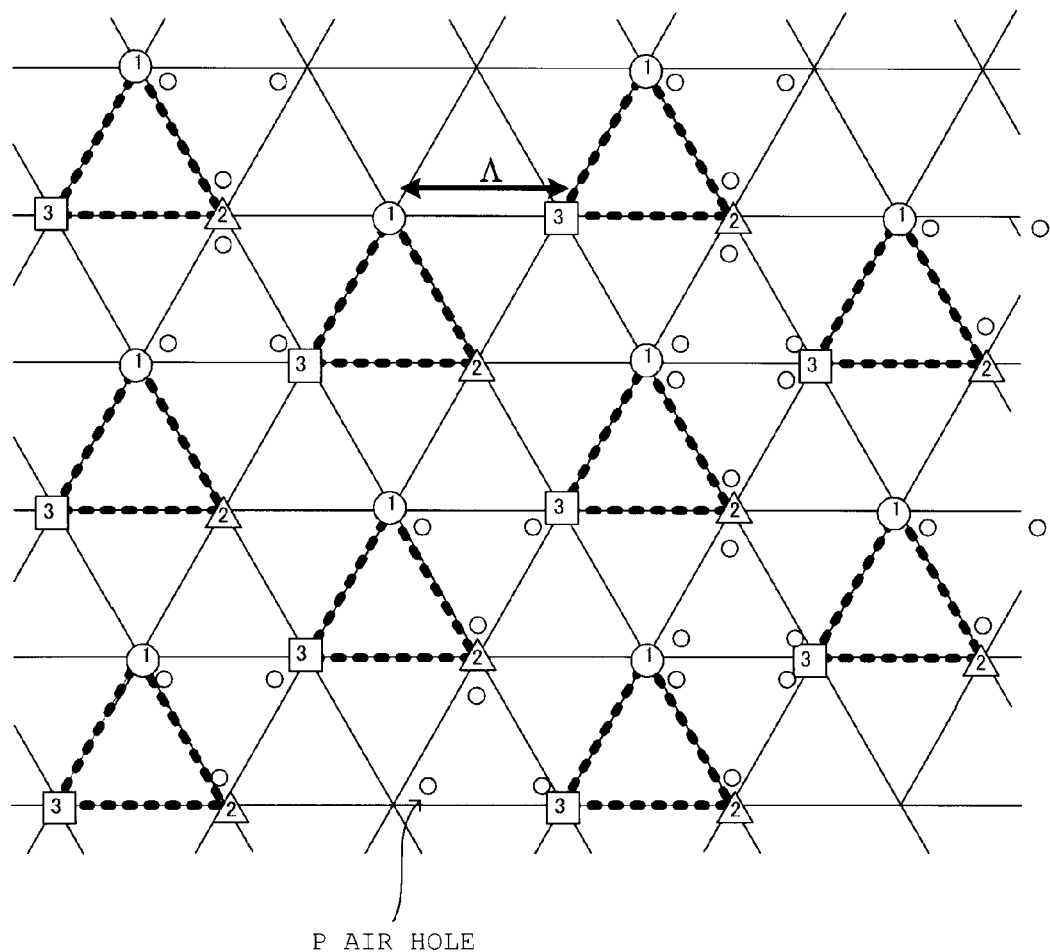
[FIG. 22]

FIG. 22 shows a configuration example of the second mode of perturbation. In the configuration example shown in FIG. 22, low refractive index regions P are arranged in the cladding part. This low refractive index region P, which corresponds to a heterogeneous core arranged between homogeneous cores in the first mode, generates a shift in the propagation constants of the homogeneous cores and thereby suppresses the coupling between the homogeneous cores.

The low refractive index region P may be formed by a hole such as an air hole. The arrangement positions and the number of low refractive index regions P are adjusted such that a perturbation to the neighboring cores differs.

The multiple cores included in a multicore fiber of the present invention may have a configuration of heterogeneous cores all of which have different propagation constants, a configuration of homogeneous cores all of which have the same propagation constant, a configuration of heterogeneous cores where all neighboring cores have different propagation constants, and a configuration that includes heterogeneous cores which have different propagation constants for neighboring cores and homogeneous cores which have the same propagation constant.

FIG. 23 is a diagram showing an example of a combination of heterogeneous cores and homogeneous cores configuring a multicore fiber of the present invention.

Figure 23A:
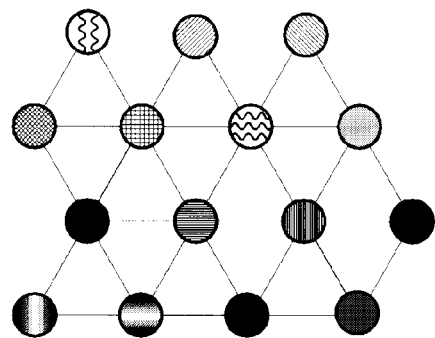
FIG. 23A-D is a diagram showing an example of a combination of heterogeneous cores and homogeneous cores configuring a multicore fiber of the present invention.
Figure 23B:
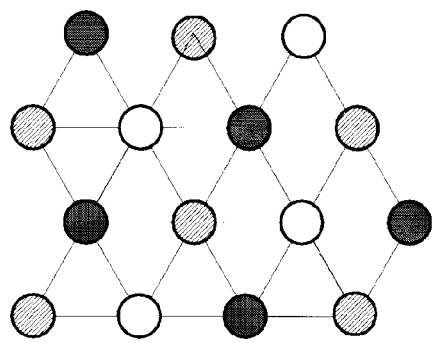
Figure 23C:
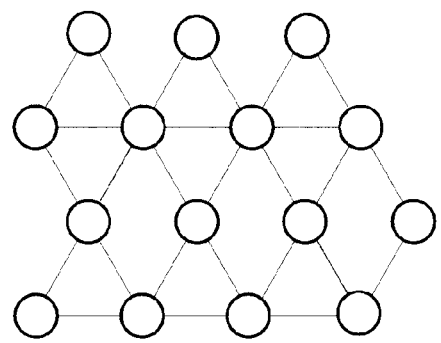
Figure 23D:
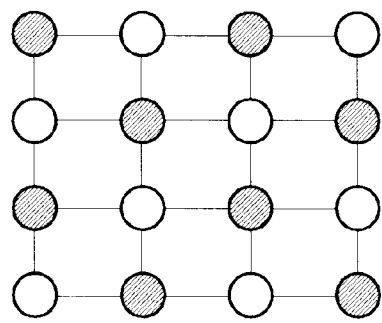
Figure 24A:
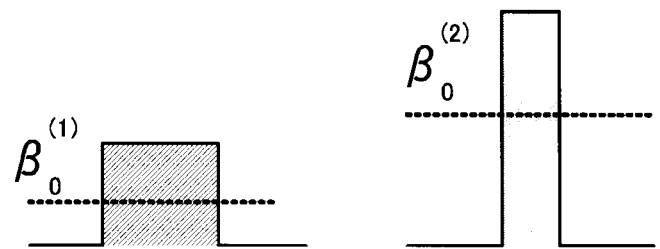
FIG. 24A-B is a diagram showing a model for describing the inter-core coupling state of a multicore fiber.
Figure 24B:
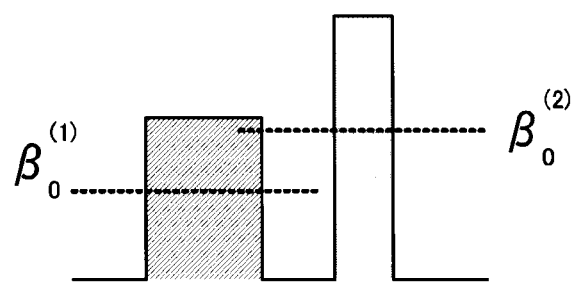
Figure 25A:
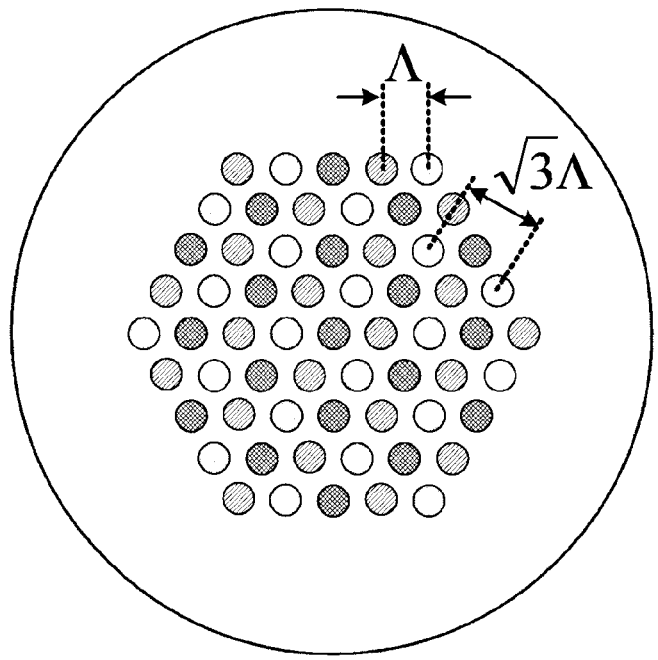
FIG. 25A-B is a diagram showing an example of different propagation constants.
Figure 25B:
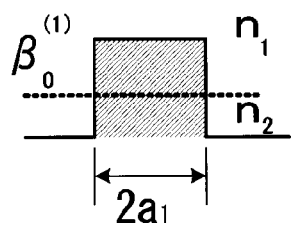
Figure 25C:
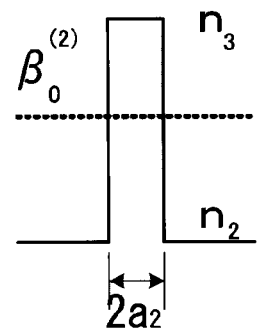
[FIG. 25]
Figure 25D:
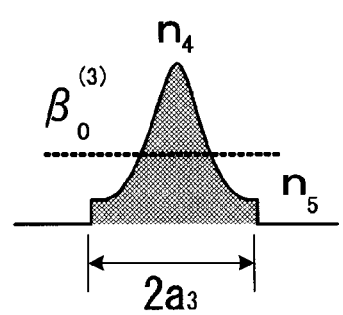
Figure 26:
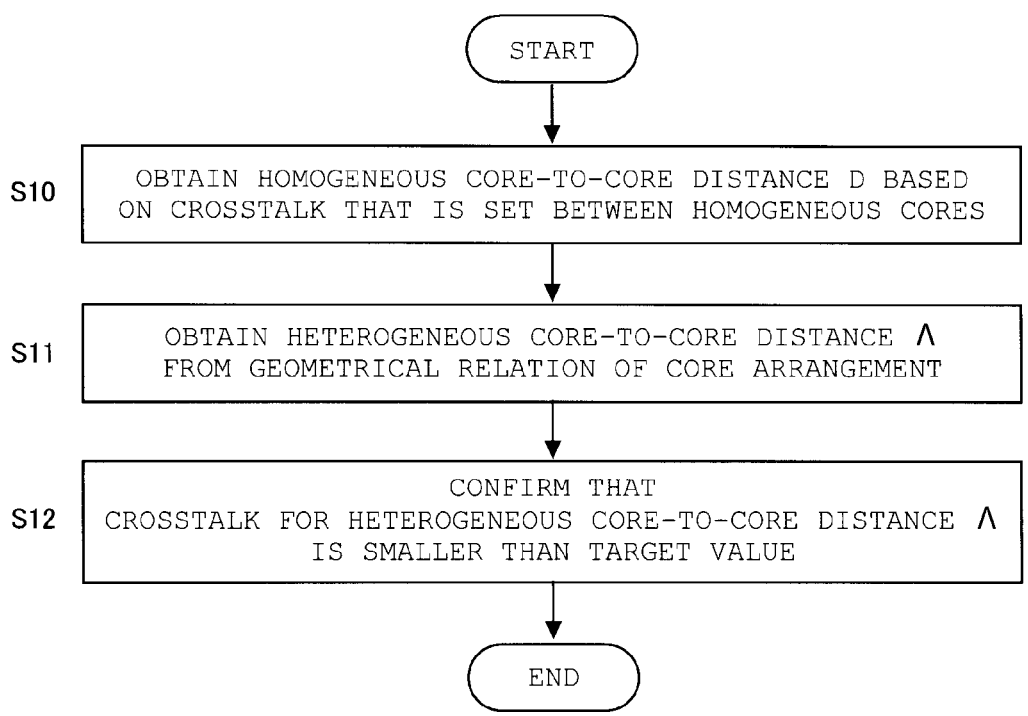
[FIG. 26]
Figure 27A:
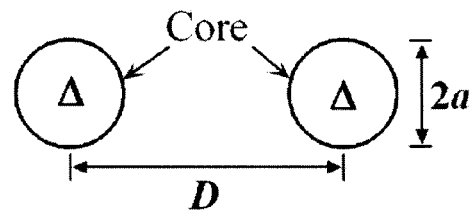
FIG. 27A-B is a diagram showing the conventional procedure for determining the homogeneous core-to-core distance D.
Figure 27B:
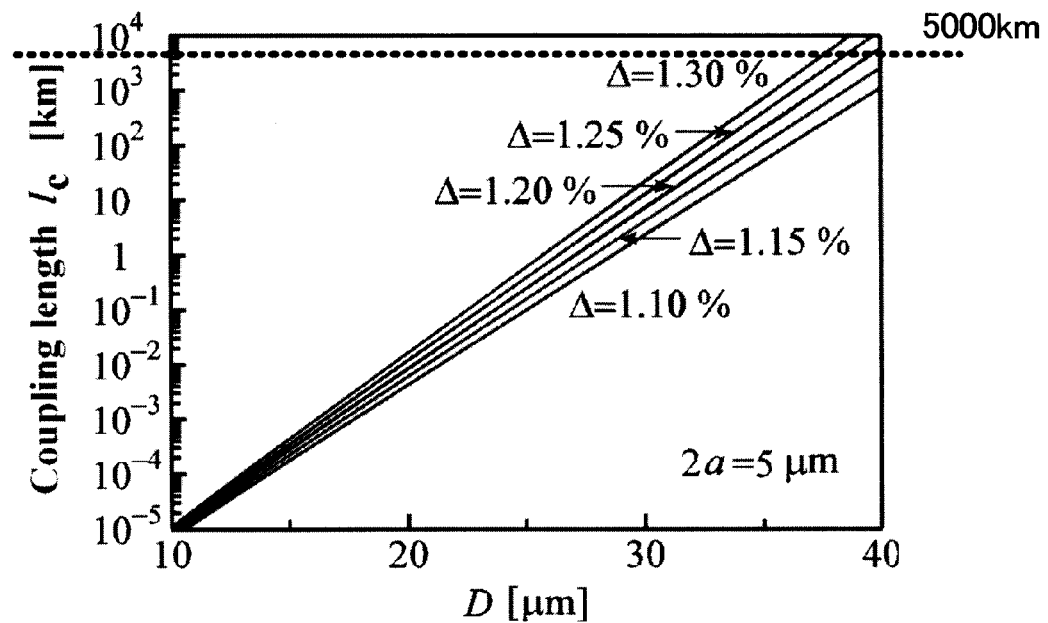
Figure 28A:
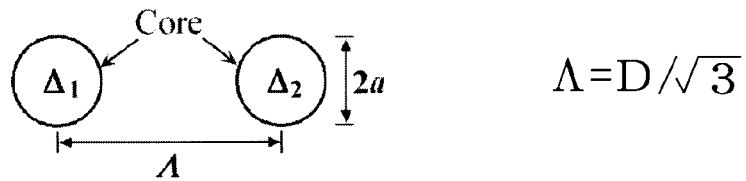
FIG. 28A-C is a diagram showing crosstalk between heterogeneous cores and a core arrangement.
Figure 28B:
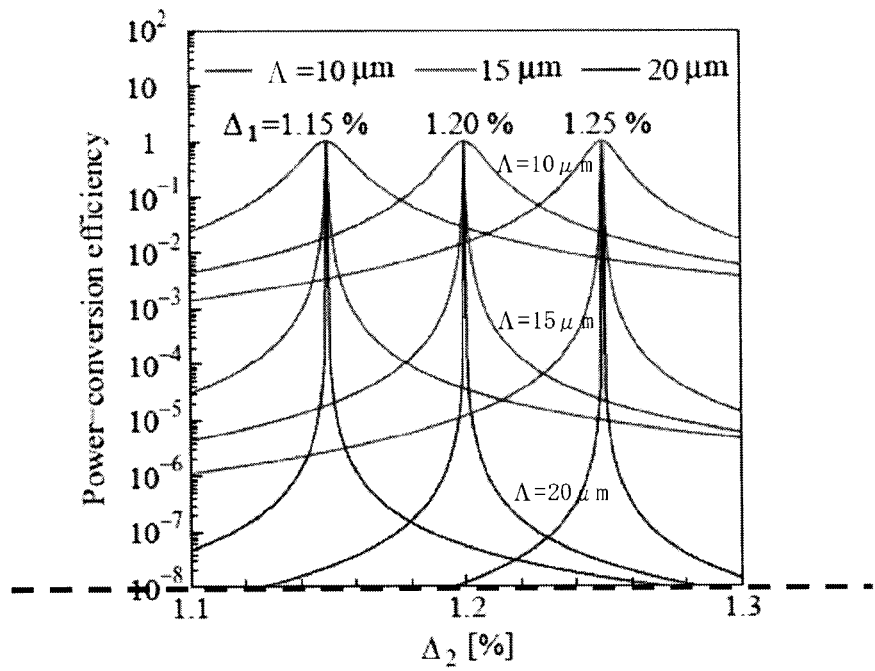
Figure 28C:
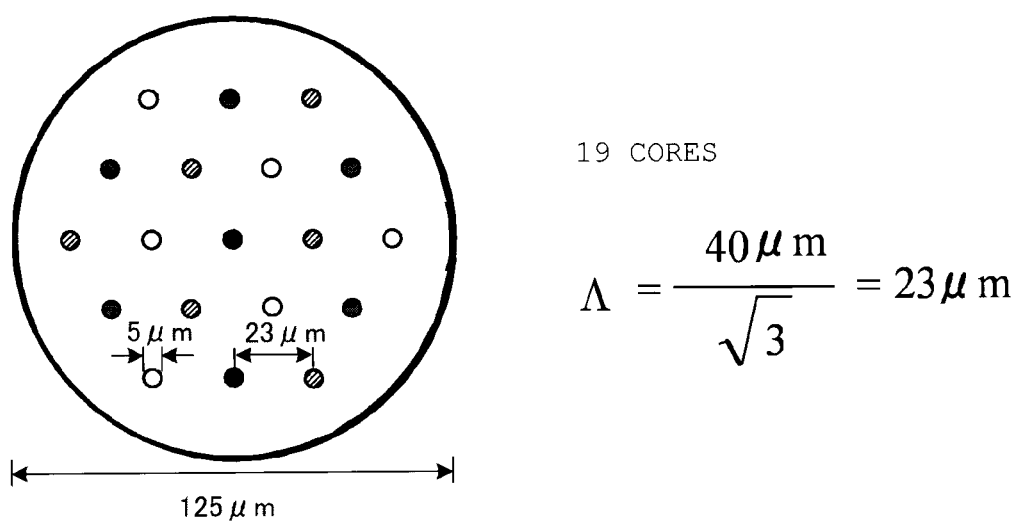

FIG. 23A shows an example of the configuration of heterogeneous cores all of which have different propagation constants, FIG. 23B shows the configuration of heterogeneous cores where all neighboring cores have different propagation constants, FIG. 23C shows the configuration of homogeneous cores all of which have the same propagation constant, and FIG. 23D shows the configuration that includes heterogeneous cores which have different propagation constants for neighboring cores and homogeneous cores which have the same propagation constant. The configuration example shown in FIG. 23B is the configurations shown in FIG. 10 and FIG. 12 to FIG. 14, and the configuration example shown in FIG. 23D is the configurations shown in FIG. 15 and FIG. 16.

[4. Example of Perturbation Caused by High Refractive Index Region]

Next, the following describes a mode in which a perturbation is caused in the second mode of perturbation of the present invention by providing high refractive index regions at positions shifted from the lattice points arranged periodically.

The second mode of perturbation caused by high refractive index regions is configured by replacing the parts, corresponding to the heterogeneous cores in the first mode of perturbation described above, by high refractive index regions.

In FIG. 22 used in the description of low refractive index regions, high refractive index regions are arranged instead of low refractive index regions P arranged in the cladding. This high refractive index region, which corresponds to a heterogeneous core arranged between homogeneous cores in the first mode, generates different amounts of shift in the propagation constants of homogeneous cores to suppress the coupling between the homogeneous cores.

As the high refractive index region, a member with a refractive index higher than that of the cladding is used. The arrangement positions and the number of high refractive index regions are adjusted such that a perturbation to the neighboring cores differs.

This high refractive index region, though configured similarly to that of a core, through which light is guided, in the relation to the refractive index to the cladding, is used not as a region through which light is guided but as a region that gives a perturbation.

Industrial Applicability

The ability to suppress coupling between homogeneous cores according to the present invention, which is accomplished by shifting propagation constants via a perturbation, is applicable not only to a heterogeneous multicore fiber that includes heterogeneous cores, among which one of the relative refractive index difference from the cladding, core diameter, and refractive index distribution in the core is different, but also to a homogeneous multicore fiber that includes cores having the same propagation constant. In addition, the ability is applicable to a high refractive-index core with the relative refractive index difference $\Delta$ of about 1.10-1.3% and to a low refractive-index core with the relative refractive index difference $\Delta$ of about 0.3-0.4%.

The invention claimed is:

1. A multicore fiber in which a plurality of single mode cores are stored in one optical fiber wherein
the cores are a plurality of cores including homogeneous cores having the same propagation constant and heterogeneous cores having different propagation constants or a plurality of cores including only homogeneous cores having the same propagation constant,
for the homogeneous cores, a perturbation part is provided between each homogeneous core and a homogeneous core nearest to the homogeneous core,
said plurality of cores are arranged with lattice points of a lattice-point arrangement as reference positions and said perturbation part is arranged at a position shifted from the reference positions, and
said perturbation part, located near homogeneous cores, gives different perturbations to propagation constants of the homogeneous cores to allow the propagation constants to have different values by varying the propagation constants of the homogeneous cores from original propagation constants by different amounts and, thereby, decreases coupling between the homogeneous cores.

2. The multicore fiber according to claim 1 wherein
said perturbation part is a heterogeneous core arranged at a position shifted from the reference positions.

3. The multicore fiber according to claim 2 wherein
said heterogeneous core has a propagation constant different from the propagation constants of the homogeneous cores because at least one of a relative refractive index difference between a core and a cladding, a core diameter, and a refractive index distribution in a core is different.

4. The multicore fiber according to claim 1 wherein
said perturbation part is a low refractive index region or a high refractive index region that is located at a position shifted from the reference positions and that has a refractive index different from a refractive index of a cladding.

5. The multicore fiber according to claim 4 wherein
said low refractive index region is a hole formed in the cladding between the cores and formed in a fiber longitudinal direction and said hole has therein an air layer or a member having a refractive index lower than the refractive index of the cladding.

6. The multicore fiber according to claim 4 wherein
said high refractive index region is a hole formed in the cladding between the cores and formed in a fiber longitudinal direction and said hole has therein a member having a refractive index higher than the refractive index of the cladding.

7. The multicore fiber according to claim 1 wherein
said lattice-point arrangement is a triangular arrangement in which each lattice point is at an equal angle with, and at an equal distance to, six lattice points that are nearest to, and are arranged around, the lattice point,
three types of cores are triangularly arranged periodically with lattice points of said triangular arrangement as reference positions, propagation constants of the three types of cores being different because at least one of a relative refractive index difference from a cladding, a core diameter, and a refractive index distribution in a core is different, and
the arrangement of said perturbation parts forms a first core group, a second core group, and a third core group in the arrangement of the reference positions with the three types of triangularly-arranged nearest cores as a unit, the first core group being a core group in which the three types of cores are arranged at lattice points which are reference positions, the second core group being a core group in which the three types of cores are arranged at positions determined by shifting the three types of cores from lattice points, which are reference positions, in a direction of the inside of the triangle arrangement, the third core group being a core group in which the three types of cores are arranged at positions determined by shifting through rotation of the three types of cores from the lattice points, which are reference positions, around the center of said triangular arrangement.

8. The multicore fiber according to claim 1 wherein
said lattice-point arrangement is a triangular arrangement in which each lattice point is at an equal angle with, and at an equal distance to, six lattice points that are nearest to, and are arranged around, the lattice point,
three types of cores are triangularly arranged periodically with lattice points of the triangular arrangement as reference positions, propagation constants of the three types of cores being different because at least one of a relative refractive index difference from a cladding, a core diameter, and a refractive index distribution in a core is different,
arrangement positions of said perturbation parts in an arrangement of the reference positions are determined in such a way that
core groups are formed each with the three types of triangularly-arranged nearest cores as a unit,
the core groups are classified into three core groups in said triangular arrangement,
the three types of cores of each of the core groups are rotated from lattice points around the center of said triangular arrangement and, at the same time, a rotation angle or a rotation direction of said perturbation parts is made different on a core group basis, and
said perturbation parts are arranged at positions determined by shifting by the rotation.

9. The multicore fiber according to claim 1 wherein
said lattice-point arrangement is a triangular arrangement in which each lattice point is at an equal angle with, and at an equal distance to, six lattice points that are nearest to, and are arranged around, the lattice point,
three types of cores are triangularly arranged periodically with lattice points of the triangular arrangement as reference positions, propagation constants of the three types of cores being different because at least one of a relative refractive index difference from a cladding, a core diameter, and a refractive index distribution in a core is different,
arrangement positions of said perturbation parts in an arrangement of the reference positions are determined in such a way that core groups are formed each with the three types of triangularly-arranged nearest cores as a unit, the core groups are classified into three core groups in said triangular arrangement, the three types of cores in each of the core groups are shifted in an inward direction or an outward direction toward the center of said triangular arrangement and, at the same time, a shift amount of said perturbation parts is made different on a core group basis, and said perturbation parts are arranged at positions determined by shifting by the shift.

10. The multicore fiber according to claim 1 wherein said lattice-point arrangement is a triangular arrangement in which each lattice point is at an equal angle with, and at an equal distance to, six lattice points that are nearest to, and are arranged around, the lattice point, said plurality of cores are a combination of a plurality of types of cores whose propagation constants are different because at least one of a relative refractive index difference from a cladding, a core diameter, and a refractive index distribution in a core is different, said plurality of types of cores are triangularly arranged periodically in a rotation symmetry direction of 60 degrees with lattice points of said triangular arrangement as reference positions, an arrangement position of each core of said perturbation parts in an arrangement of the reference positions is determined in such a way that, from a lattice point that is the reference position of the core, the core is arranged at a position shifted in an x-axis direction and in a y-axis direction on a row basis and a column basis and, at the same time, a shift amount in the x-axis direction and the y-axis direction is different on a row basis and a column basis wherein a direction in which nearest lattice points form a line is selected as the x-axis direction, lattice points in the x-axis direction form a row, and lattice points in a direction +60 degrees or −60 degrees from the x-axis form a column, and the core is arranged at a position determined by shifting by the arrangement.

11. The multicore fiber according to claim 1 wherein said lattice-point arrangement is a rectangular arrangement in which the lattice points are periodically arranged in an x-axis direction and in a y-axis direction respectively, an arrangement position of each core of said perturbation parts is a position determined by shifting the core from a lattice point of said rectangular arrangement in the x-axis direction and in the y-axis direction, and a heterogeneous core to core interval in the x-axis direction is $\Lambda x$ and a heterogeneous core to core interval in the y-axis direction is $\Lambda y$.

12. An arrangement method of cores of a multicore fiber in which a plurality of single mode cores are stored in one optical fiber wherein the cores are a plurality of cores including homogeneous cores having the same propagation constant and heterogeneous cores having different propagation constants or a plurality of cores including only homogeneous cores having the same propagation constant, in a lattice-point arrangement in which a plurality of lattice points, which have translational symmetry and rotational symmetry or one of translational symmetry and rotational symmetry, are periodically arranged two-dimensionally in a cross section of the fiber, said plurality of cores are arranged with lattice points of the lattice-point arrangement as reference positions, between a pair of homogeneous cores that is the nearest pair of homogeneous cores, a perturbation part is arranged at a position shifted from a reference position, and the arrangement of said perturbation part, located near homogeneous cores, gives different perturbations to propagation constants of the homogeneous cores to vary the propagation constants of the homogeneous cores from original propagation constants by different amounts and, thereby, decreases coupling between the homogeneous cores.

13. The arrangement method of cores of a multicore fiber according to claim 12 wherein said lattice-point arrangement is a triangular arrangement in which each lattice point is at an equal angle with, and at an equal distance to, six lattice points that are nearest to, and are arranged around, the lattice point.

14. The arrangement method of cores of a multicore fiber according to claim 12 wherein said lattice-point arrangement is a rectangular arrangement in which the lattice points are periodically arranged in an x-axis direction and in a y-axis direction respectively.

* * * * *